United States Patent
Constantino, Jr. et al.

(10) Patent No.: US 9,226,619 B2
(45) Date of Patent: Jan. 5, 2016

(54) HANDHELD POWDERING DEVICE

(71) Applicants: John Constantino, Jr., Floral Park, NY (US); John Constantino, Sr., Floral Park, NY (US)

(72) Inventors: John Constantino, Jr., Floral Park, NY (US); John Constantino, Sr., Floral Park, NY (US)

( * ) Notice: Subject to any disclaimer, the term of this patent is extended or adjusted under 35 U.S.C. 154(b) by 0 days.

(21) Appl. No.: 14/245,669

(22) Filed: Apr. 4, 2014

(65) Prior Publication Data
US 2014/0299049 A1 Oct. 9, 2014

Related U.S. Application Data

(60) Provisional application No. 61/808,349, filed on Apr. 4, 2013.

(51) Int. Cl.
*B07B 1/02* (2006.01)
*A47J 43/22* (2006.01)
*A23P 1/08* (2006.01)

(52) U.S. Cl.
CPC ............. *A47J 43/22* (2013.01); *A23P 1/082* (2013.01); *B07B 1/02* (2013.01)

(58) Field of Classification Search
CPC ...... A47J 43/22; A47J 43/04; B07B 2201/04; B07B 1/02; B07B 13/16; A23P 1/082
USPC ........ 209/370, 374, 417; 222/189.02, 189.03, 222/189.04
See application file for complete search history.

(56) References Cited

U.S. PATENT DOCUMENTS

| | | | | | |
|---|---|---|---|---|---|
| 351,203 | A | * | 10/1886 | Reese | 209/357 |
| 1,572,112 | A | * | 2/1926 | Forgeson | 209/323 |
| 2,212,788 | A | * | 8/1940 | Nakahiro | 209/251 |
| 2,416,810 | A | * | 3/1947 | Bailey | 209/357 |
| 4,271,011 | A | * | 6/1981 | Spencer et al. | 209/236 |
| 4,534,858 | A | * | 8/1985 | Aldrich et al. | 209/236 |
| 5,078,090 | A | * | 1/1992 | Richman | A21C 9/04 118/13 |
| 5,632,417 | A | * | 5/1997 | Robbins et al. | 222/158 |
| 5,850,923 | A | * | 12/1998 | DeCoster et al. | 209/417 |
| 7,011,038 | B2 | * | 3/2006 | Patsalos | A23P 1/082 118/13 |
| 8,132,578 | B2 | * | 3/2012 | LoPrete | 132/307 |
| 8,827,185 | B2 | * | 9/2014 | Simmons et al. | 239/378 |
| 8,931,643 | B2 | * | 1/2015 | Yu | 209/389 |
| 2009/0205673 | A1 | * | 8/2009 | Richardson | 132/307 |
| 2014/0246121 | A1 | * | 9/2014 | Henry et al. | 141/69 |

* cited by examiner

*Primary Examiner* — Joseph C Rodriguez
(74) *Attorney, Agent, or Firm* — Brad M. Behar & Associates, PLLC

(57) ABSTRACT

The present invention is a handheld device for flouring/breading foods comprising two chambers that are capable of removably connecting together each chamber having a sieve. The foods chamber can connect to the flour chamber in a screw-like fashion, using grooves and channels, using buttons and snap fittings, using magnets, hook and loop tape, wing nuts, or the like. Preferably, the openings in the food chamber sieve are greater in size than the openings in the flour chamber sieve which is removable. The device further comprises a lid hingedly connected to the top of the food chamber and a handle for grasping the device with one hand. The lid is preferably spring hinged such that when opened, the lid is maintained open preventing the lid from closing when the device is tilted. The present invention also includes the above device with more than two sieves decreasing in opening size from the top down in the device.

15 Claims, 28 Drawing Sheets

US 9,226,619 B2

HANDHELD POWDERING DEVICE

CROSS-REFERENCE TO RELATED APPLICATION

This application claims the benefit of U.S. Provisional Application Ser. No. 61/808,349 filed on Apr. 4, 2013 which is expressly incorporated herein in its entirety by reference thereto.

FIELD OF THE INVENTION

The present invention relates to cooking methods and procedures and the devices, tools, and machinery used to prepare and cook food. More specifically, the present invention relates to devices used to prepare powdered and breaded foods prior to frying, such as calamari and/or zucchini, as well as other foods.

BACKGROUND OF THE INVENTION

Flouring and breading food is a common procedure. There are many different foods that are floured and then fried such as zucchini, calamari, chicken, egg plant, shrimp, clam strips and oysters. The flouring process typically includes mixing flour and spices (e.g., salt, oregano, and black pepper) in a mixing bowl, dredging the food (e.g., zucchini, chicken, calamari, etc.) in the bowl to cover the surface of the food with the flour mixture and shaking off the excess flour mixture, and then frying the food. Besides flour, foods are sometimes coated or dusted with, for example, powdered sugar or cinnamon (e.g., zeppole after it comes out of fryer).

Oftentimes, a dipping step is added to the flouring process wherein the food (e.g., zucchini—calamari is wet and does not need the dipping) is dipped in egg and/or milk before dredging in the flour mixture.

A breaded exterior is sometimes desired on the food. The breading helps to seal in moisture when deep-frying or pan-frying foods and the breading also provides a crunchy and tasteful exterior. Breading includes a similar three-step process which helps keep the breading stuck to food instead of falling off in the hot oil: 1) dredge the item in flour; 2) dip it in egg wash; 3) coat it in breadcrumbs.

Particularly in a commercial kitchen, such as a restaurant, the flouring and/or breading process needs to be done quickly. Consequently, most commercial kitchens use stations where an open basin or bowl of the egg and/or milk dip is located, where an open basin or bowl of the flour mixture is kept, and a frying station preferably near the flour basin/mixture station. When the floured food, particularly calamari, is ordered, the cook/chef dips the calamari in the flour mixture shaking excess back into the flour mixture basin and then placed the floured food into the fryer. When a kitchen is busy, it is not uncommon for the dipping tasks into the flour mixture to be performed by hand.

Most commercial kitchens use the same basins of egg/milk and flour mixture during single day. The basins are usually not cleaned until the end of the day when the restaurant is closed and the customers are gone. A serious health risk is thereby created because the flour basin becomes contaminated between uses, especially when different foods are placed into the basin, such as, for example, certain types of raw foods, e.g., fish, beef, pork, and poultry. The need and desire to use "clean" ingredients and basins/trays to avoid the addition of unwanted bacteria (e.g. *salmonella*, *listeria*, and *escherichia coli*) and avoid food contamination (cross-contamination) and food-borne diseases is compromised due to the need for expediency and the costs for discarding unused materials. Use of "clean" ingredients is also important to protect people with food allergies. For example, people with Celiac's disease cannot have their food come in contact with other foods or utensils that have gluten. Technically, commercial kitchens that utilize such methods where egg/milk and/or flour mixtures are used repeatedly, may not be compliant with health and safety laws and regulations.

Multiple/repeated use of the egg/milk and/or flour mixtures for different foods can also create undesirable effects, such as, for example, altering the taste of the foods.

The time to prepare the food using different basins and stations also consumes highly valuable time, especially time to remove small coated food pieces (and leave the flour mixture behind) from a bowl of flour mixture (e.g. calamari) which oftentimes results in the leaving behind of a few small pieces of food among the flour. Those small pieces of food left behind in the flour mixture dry out and could, often do, mistakenly get used the next time the flour mixture is used.

In some kitchens, the food is prepared with however much flour is placed in the mixing bowl or basin with the food to be coated and all of the flour is poured into the fry basket. Excess fried flour is shaken off into the garbage creating waste. Sometimes more than half the flour originally used winds up in the garbage.

The existing hand process also creates more mess on the cook's hands. Regardless of whether gloves are used, the wet food and the dried flour are contacted leading to hands being coated in a cement-like fashion.

There is a need for a device to improve this flouring/breading process, especially for calamari. A device that allows a user to repeatedly prepare single servings of floured/breaded foods easily and readily without cross-contamination and without wasting large amounts of the pre-mixtures (e.g., the egg/milk and/or the flour mixture). There is a need for a flouring/breading device that is compact, easily handled and used, and effective for preparing servings of foods. There is a need for a flouring/breading device that can be easily cleaned when not in use.

SUMMARY OF THE INVENTION

Applicants have invented a handheld device for flouring/breading that overcomes these and other shortcomings. While the invention will be described in connection with certain embodiments, it will be understood that the invention is not limited to those embodiments. To the contrary, the invention includes all alternatives, modifications and equivalents as may be included within the spirit and scope of the present invention.

The present invention is a handheld device for flouring/breading comprising two chambers, a food chamber and a flour chamber, that are capable of removably connecting together, each chamber having a sieve/sifter/screen therein. The bottom of the food chamber can connect to the top of the flour chamber in a screw-like fashion, using grooves and channels, using buttons and snap fittings, using magnets, hook and loop tape, wing nuts, tabs and slots, or the like. Preferably, the openings in the sieve in the food chamber are greater in size than the openings in the sieve in the flour chamber. For example, the openings size in the food chamber sieve may be ¼-inch squares and the openings size in the flour chamber may be 1/16-inch squares. The device further comprises a flip top lid hingedly connected to the food chamber (although a completely removable lid is also possible) and a handle on the exterior of the food chamber for grasping the food chamber and holding it with one hand. The flip top lid is preferably hinged with a spring such that when the user wants the flip top lid opened, e.g., when placing food in the food chamber or when transferring the floured food after use of the device from the food chamber and into a fryer, the lid can be opened with the same hand used to hold the handle without the need for using another hand, the spring preventing the lid from closing even when the device is tilted.

When assembled (the food chamber connected to the flour chamber), the device is cylindrically-shaped although other non-cylindrical shapes are included within the scope of the invention, e.g., a cubical flour chamber. The food chamber comprises a top with a lid and a bottom and at least one sieve. The present invention includes more than one sieve wherein the openings size in the sieves from the top down in the device decreases. Preferably, the lowest sieve in the food chamber (the one closest to its bottom) is not removable although the invention also includes removable sieves in the food chamber. The sieve(s) in the food chamber should remain in place and not fall out of position when the device is shaken and/or tilted. Accordingly, the invention includes removable sieve(s) in the food chamber wherein the sieve(s) snap in place or are held in place with fasteners (e.g., pins, screws, plates, etc.). The food chamber according to the invention thus comprises an internal compartment wherein food can be placed having an open bottom at the very bottom rim of the food chamber. There is an aperture at the bottom of the food chamber. The food chamber sieve holds a minimally sized object (e.g., food such as calamari) in the food chamber and allowing smaller objects (e.g., food like flour) to pass through the sieve, both into and out of the food chamber. The food chamber sieve(s) are preferably located near the bottom end of the food chamber.

The flour chamber is configured to hold the flour mixture. Accordingly, the flour chamber is preferably configured similar in shape to an open top bowl, cup, or container with a cylindrical side wall and a bottom. The top of the flour chamber is open providing access to the internal aperture/compartment in the flour chamber. Preferably, the top rim of the flour chamber includes a lip, indentation, ridge, or the like to support a removable sieve to be placed in the flour chamber and held in place when the device is shaken/tilted. The sieve could be held in place in the same manner as the sieves in the food compartment or using the bottom end/edge of the food chamber when connected to the flour chamber.

The food chamber removably connects to the flour chamber, preferably in a manner that allows for easy detachment, most preferably with one hand. The bottom of the food chamber may connect to the top of the flour chamber in a screw-like fashion where the two are twisted together to tighten together. Alternatively, the flour chamber could have one or more openings and grooves that receive tabs on the bottom of the food chamber allowing for a twist to connect and lock the two chambers together (e.g., the user would give it a small turn to lock into place). The two chambers could connect together using a snapped fitting and/or using magnets, hook and loop tape, wing nuts, clasps, or the like.

If the chambers are non-cylindrical, e.g., tubular rectangles, the two chambers could slidably connect using grooves or channels and corresponding lips. The invention also includes an embodiment wherein the two chambers are cylindrical except at the connection locations where they can be configured with a rectangular configuration and slidably connect using grooves and/or channels.

When the chambers are connected together, the device becomes a single unit with at least two sieves, capable of being held with one hand by a handle attached to the outside of the food chamber.

The food chamber sieve(s) is/are located near the bottom of the food chamber. The flour chamber sieve is placed as close to the top (so as not to interfere with the connection to the food chamber) of the flour chamber. Preferably, the flour chamber sieve includes a knob, handle, or other means to help grasp and remove the sieve for removal of collected debris on the sieve. The size of the openings in the flour chamber sieve are smaller in size than the openings in the food chamber sieve(s).

The food chamber may include a gasket for the flip-top lid to seal the top of the food chamber when closed. A spring hinge on the lid keeps the lid open when not closed, preferably at least 90 degrees open.

The handle most preferably includes a latch, groove, clasp, or other means to releasably hold down the lid against the force of the spring. In the preferred embodiment, when desired, e.g., after the food in the device is floured and the flour chamber is disengaged from the food chamber, the user can release the lid from the closed position with the same hand being used to hold the food chamber. For example, a tab or lip on the lid that is engaged in a grove in the handle can be pushed free using a thumb thereby releasing the lid, the force from the spring opening the lid.

The device can be made of plastic but could also be made of any food grade metal available.

BRIEF DESCRIPTION OF THE DRAWINGS

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

FIGS. 13E and 13F show the food chamber detached from the flour chamber. FIG. 13F shows an open lid on the food chamber.

FIG. 14A shows a partial cross sectional front view of an embodiment having a flour chamber sieve with a knob to grasp for removal of the flour chamber sieve and a push down release mechanism to hold the food chamber connected to the flour chamber. FIG. 14B shows a channel at the top of the flour chamber with a push up lid release. FIG. 14C shows a push down lid release. FIG. 14D shows a ¼-inch lip around the bottom of the food chamber that functions to help maintain the position of the flour chamber sieve.

DETAILED DESCRIPTION OF THE INVENTION

Figure 1:
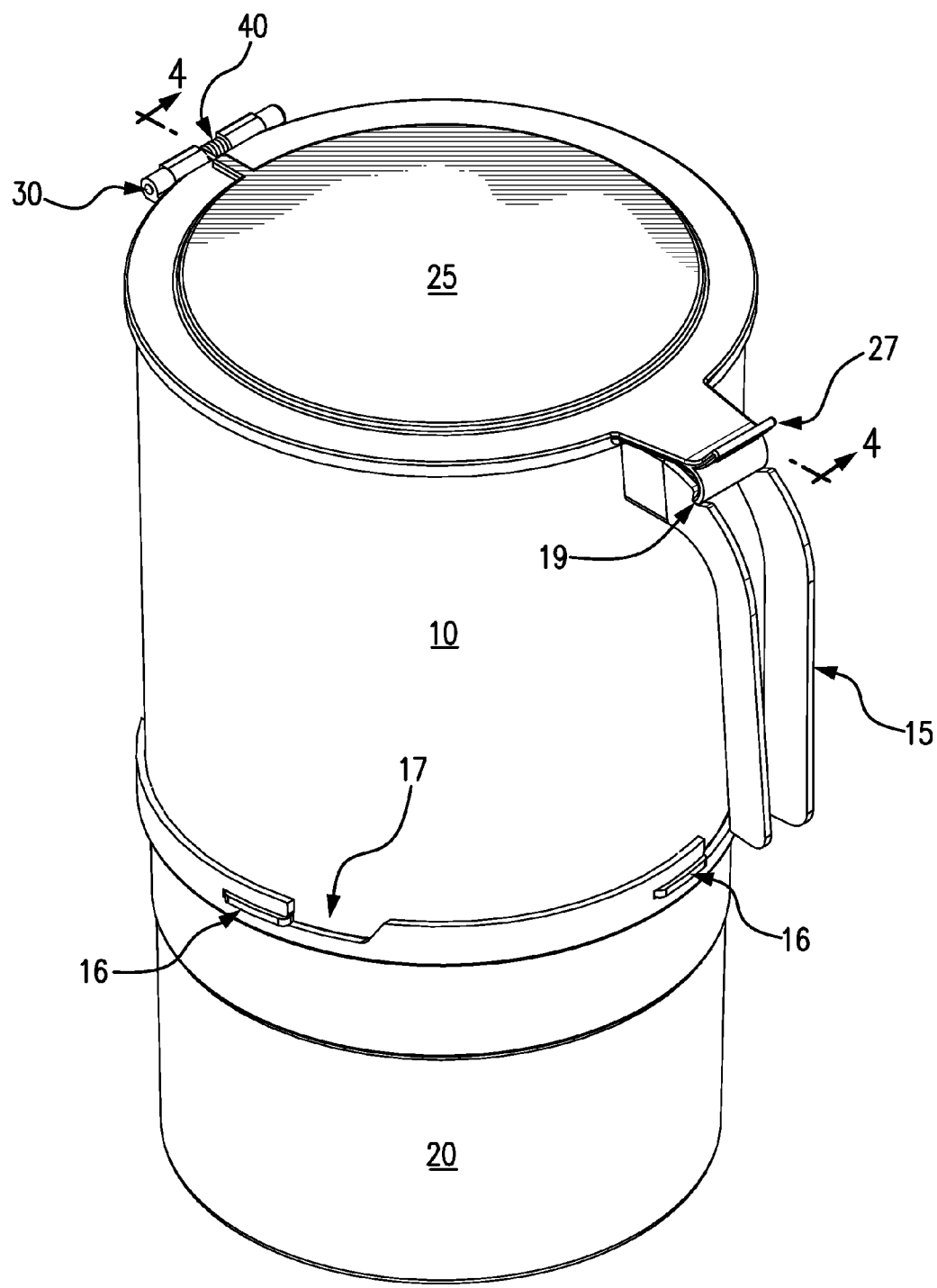
FIG. 1 is a perspective view of one embodiment of the invention shown in an assembled configuration with the food chamber connected to the flour chamber and with the lid closed.
Figure 2:
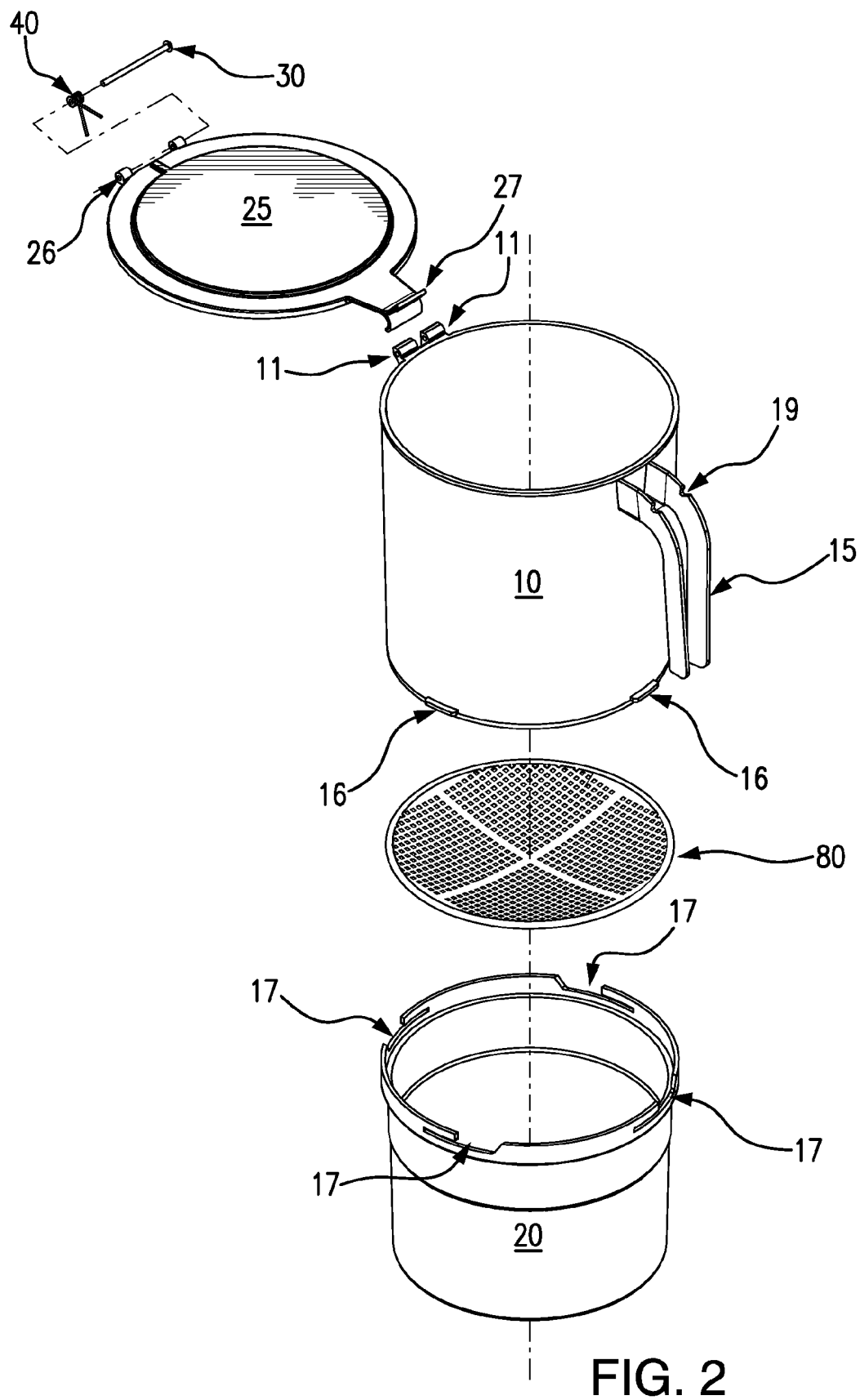
FIG. 2 is an exploded perspective view of the device shown in FIG. 1 showing the pin for the lid hinge and the spring, the eyes on lid and the food chamber lid that hold the hinge pin, the handle with grooves to receive a push tab on the lid for locking the lid in a closed position, tabs on the bottom of the food chamber used to slide into openings and grooves in the top of the flour chamber for connecting the chambers, the flour chamber sieve, and the flour chamber with the locking openings/grooves.
Figure 3:
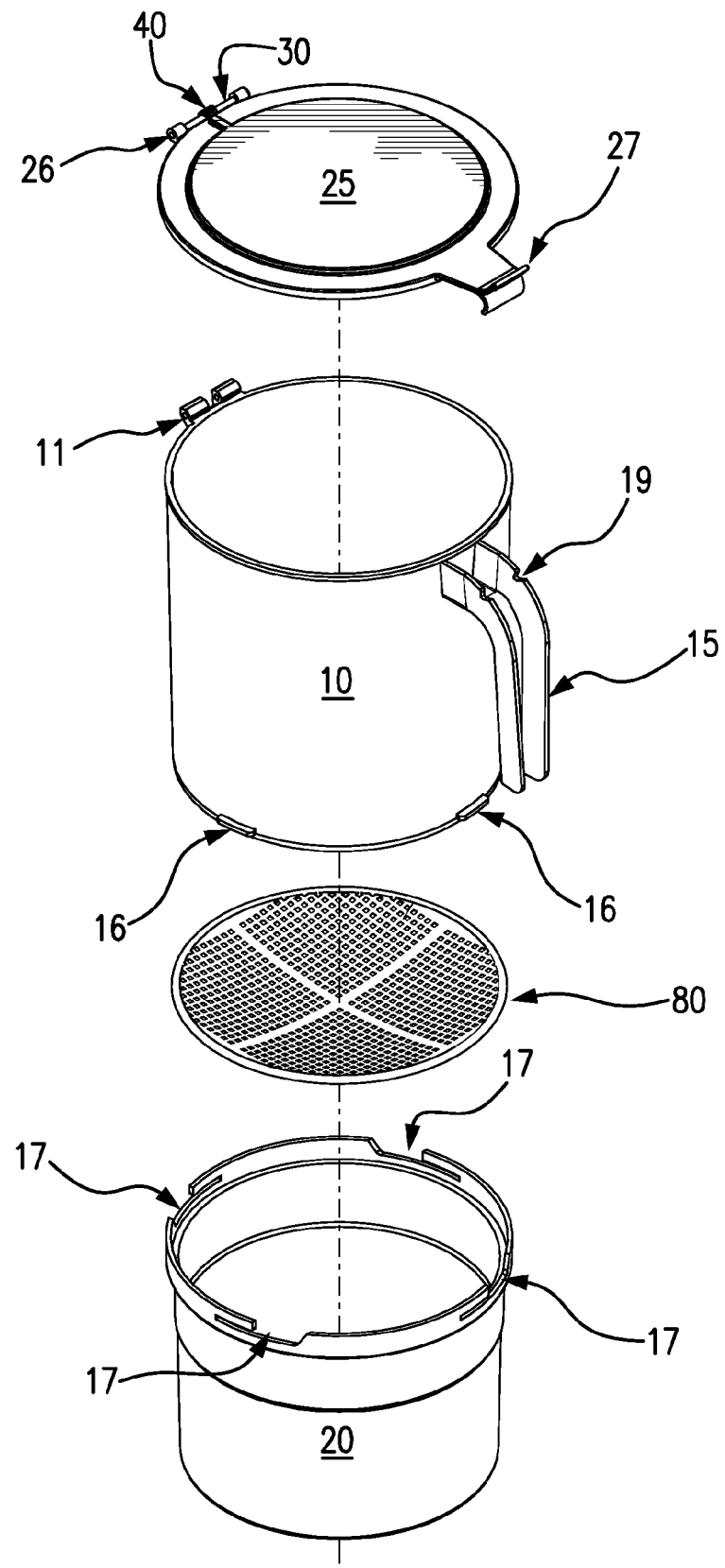
FIG. 3 is another exploded perspective view of the device shown in FIG. 1.
Figure 4:
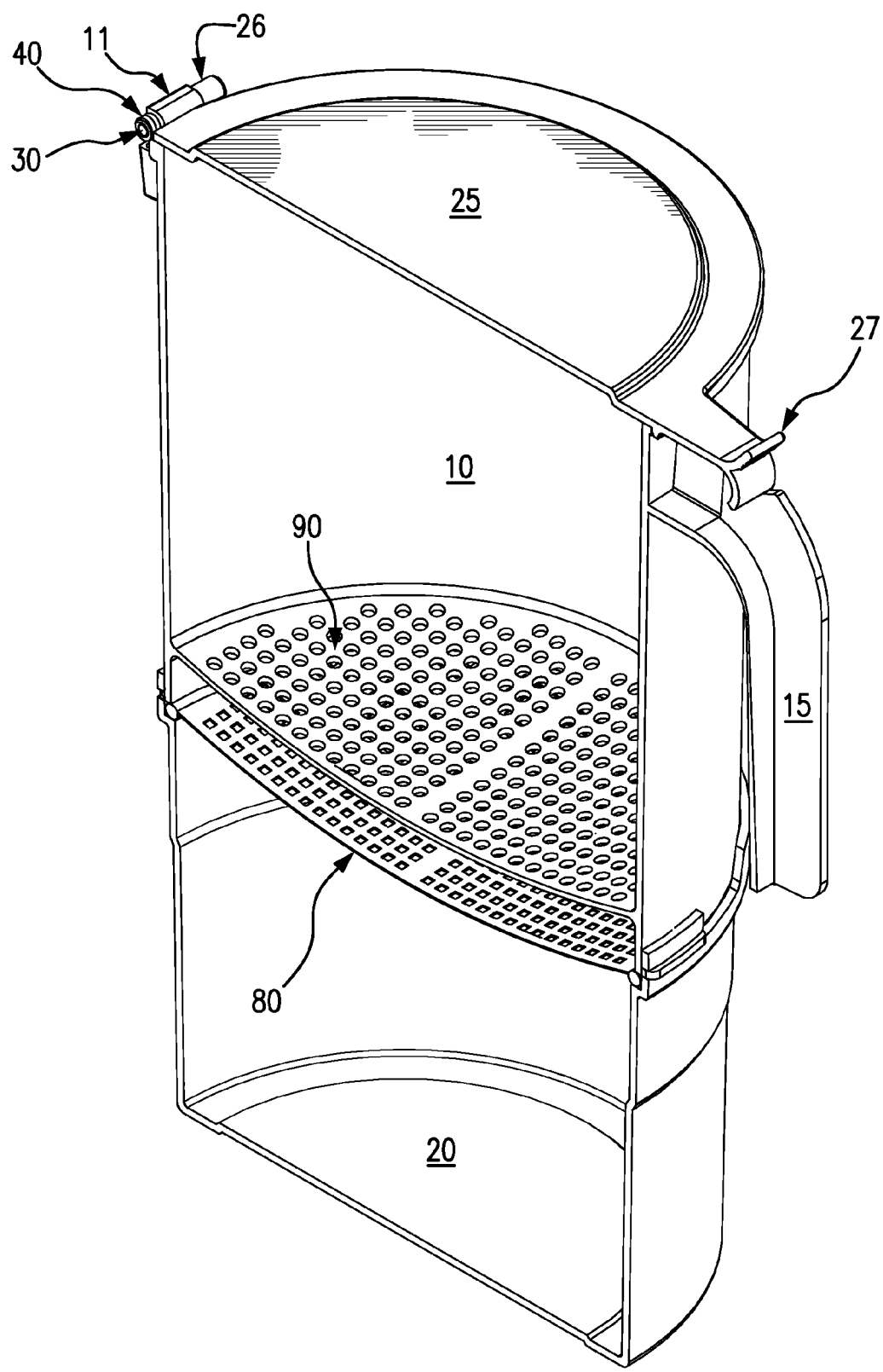
FIG. 4 is a partial section view taken at line 4-4 in FIG. 1 showing device components.
Figure 4A:
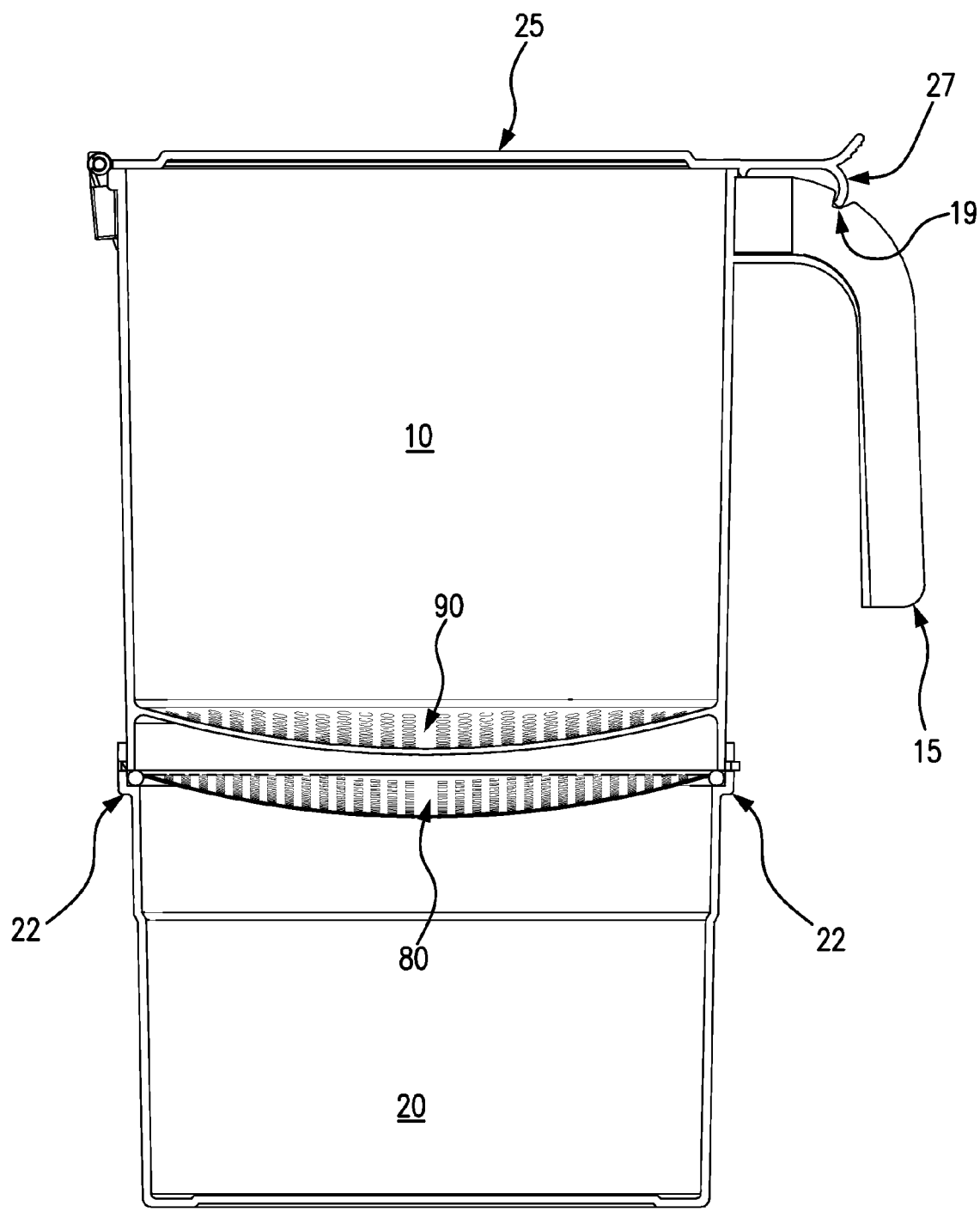
FIG. 4A is a front view of the device shown in FIG. 4.
Figure 4B:
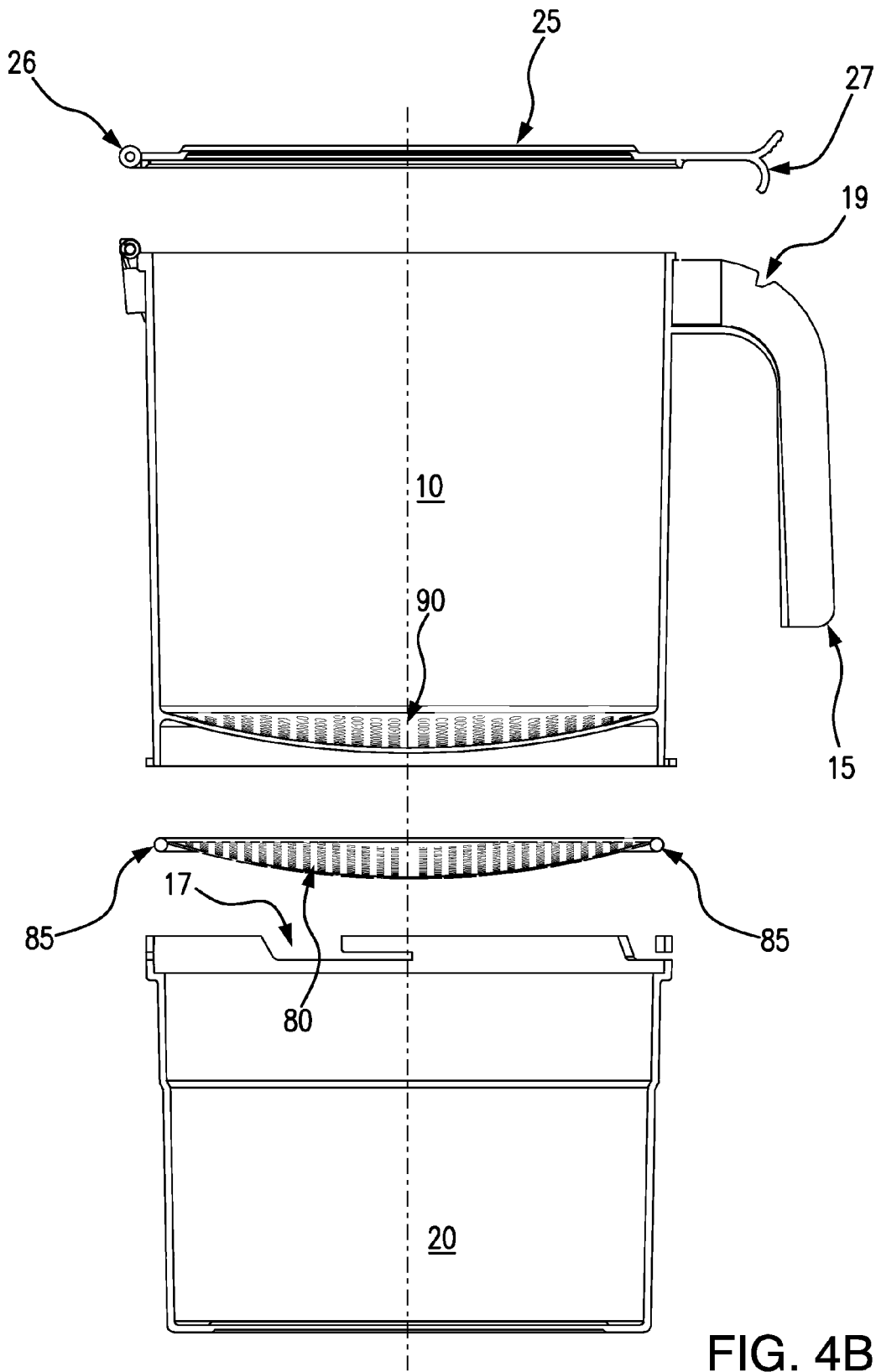
FIG. 4B is an exploded view of the device shown in FIG. 4A.
Figure 5:
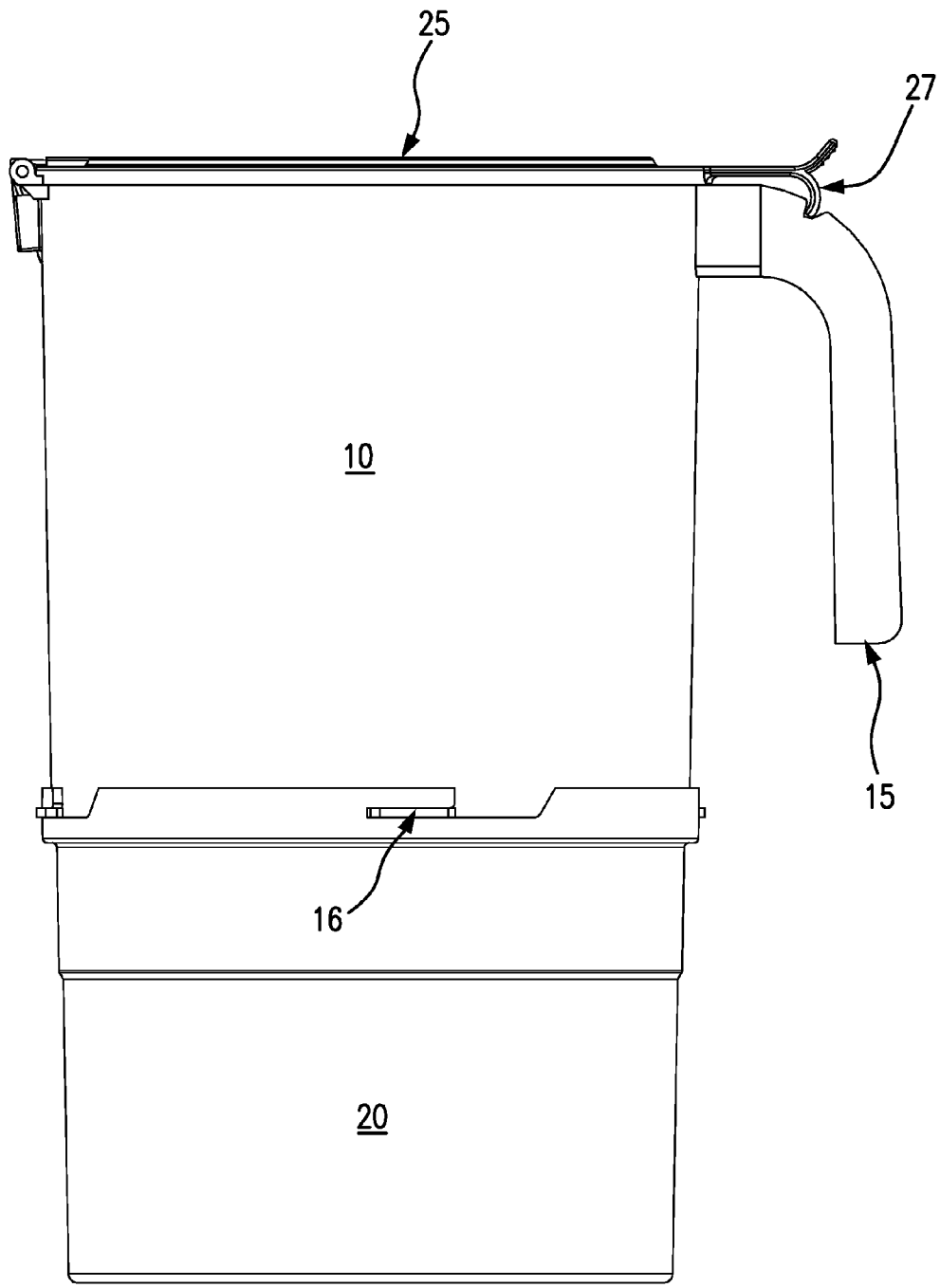
FIG. 5 is a front view of the device shown in FIG. 1.
Figure 6:
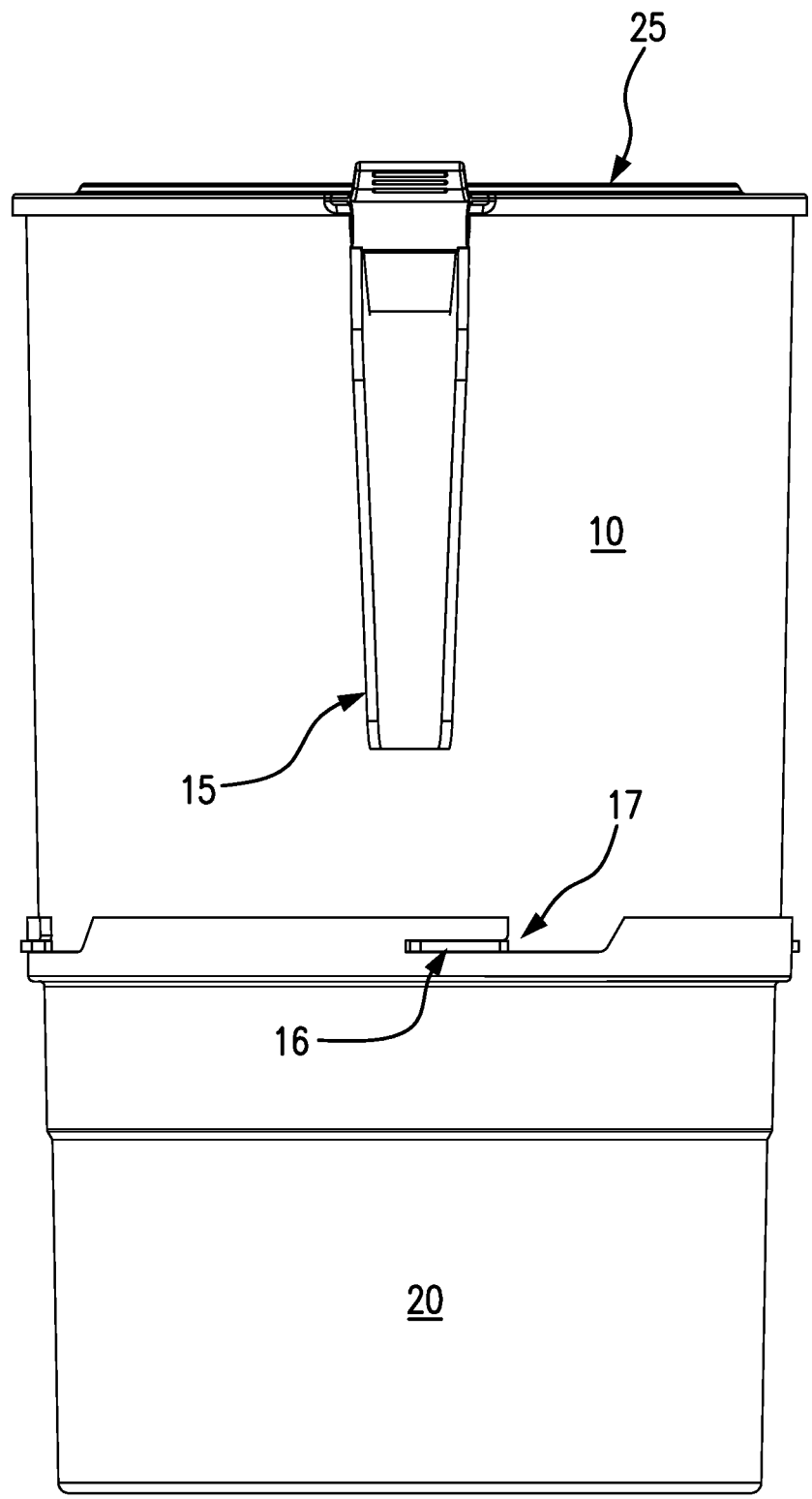
FIG. 6 is a right side view of the device shown in FIG. 1.
Figure 7:
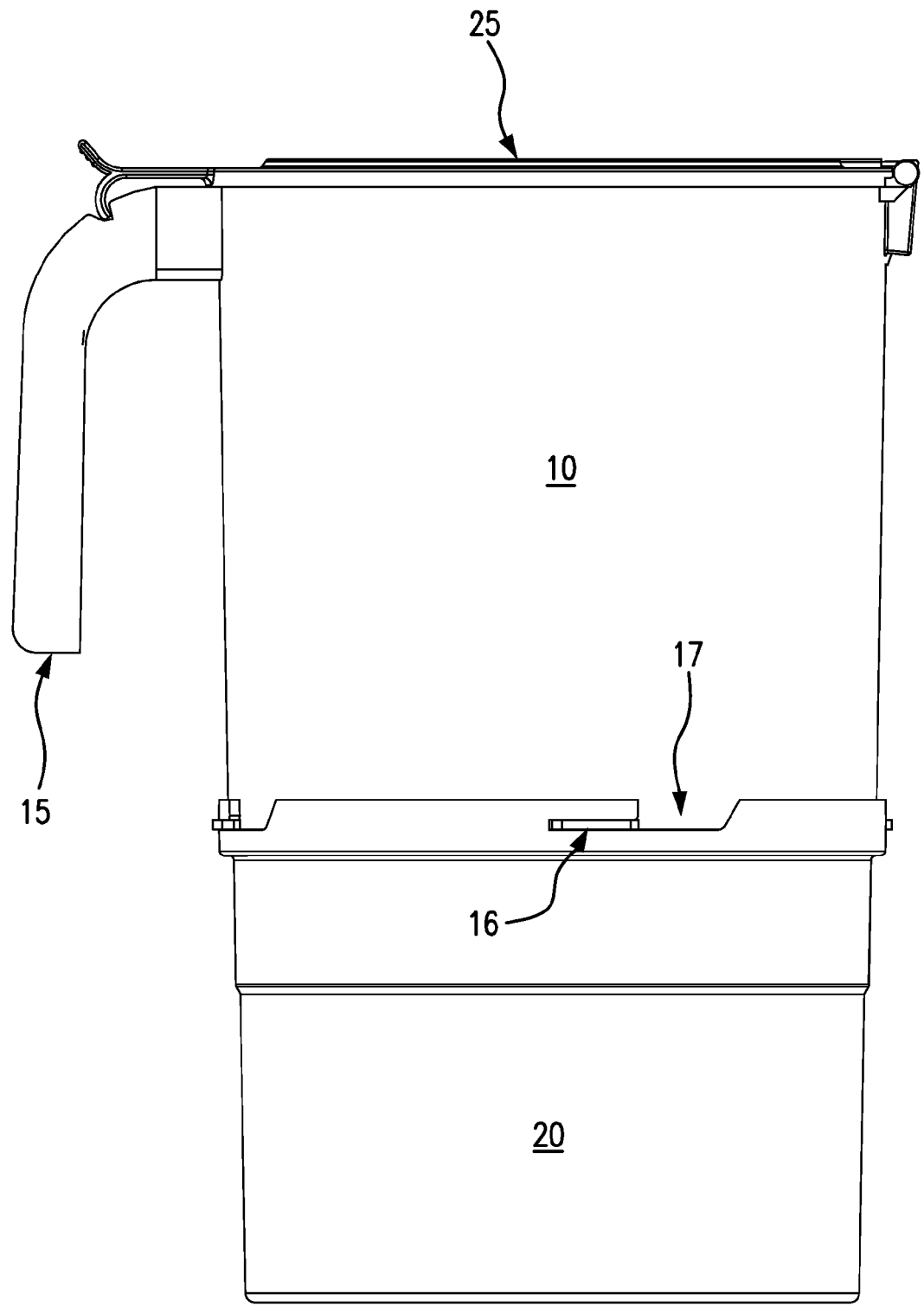
FIG. 7 is a rear view of the device shown in FIG. 1.
Figure 8:
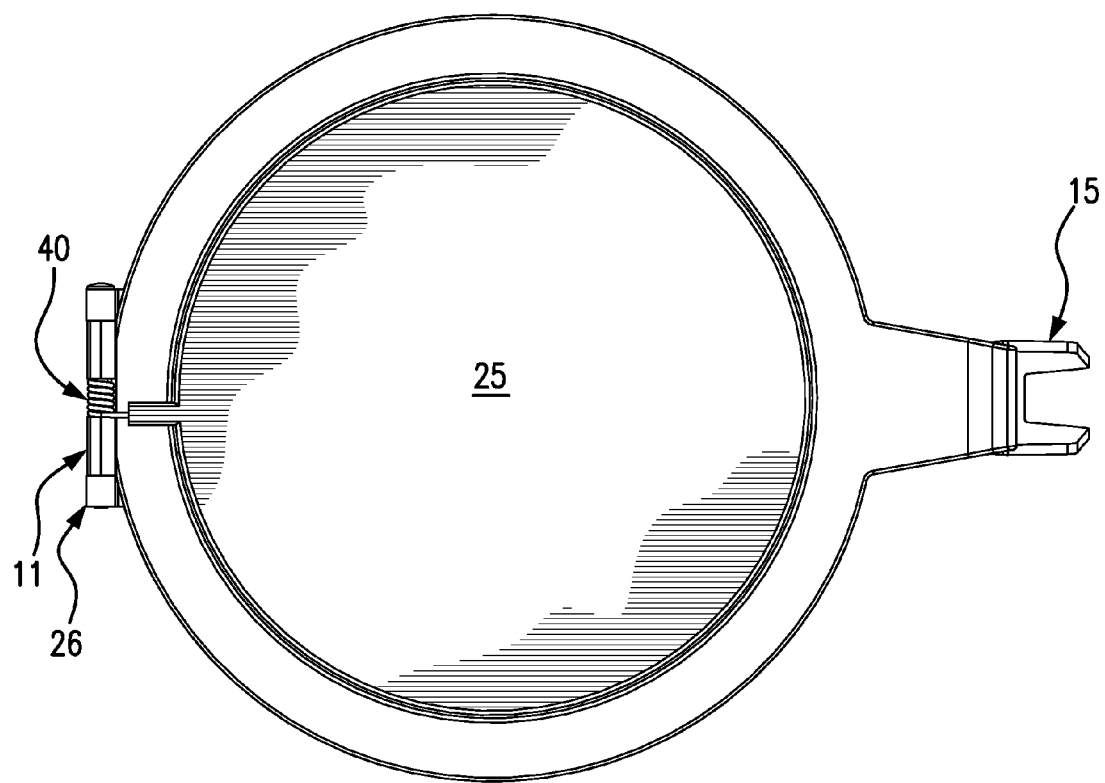
FIG. 8 is a top view of the device shown in FIG. 1.
Figure 9:
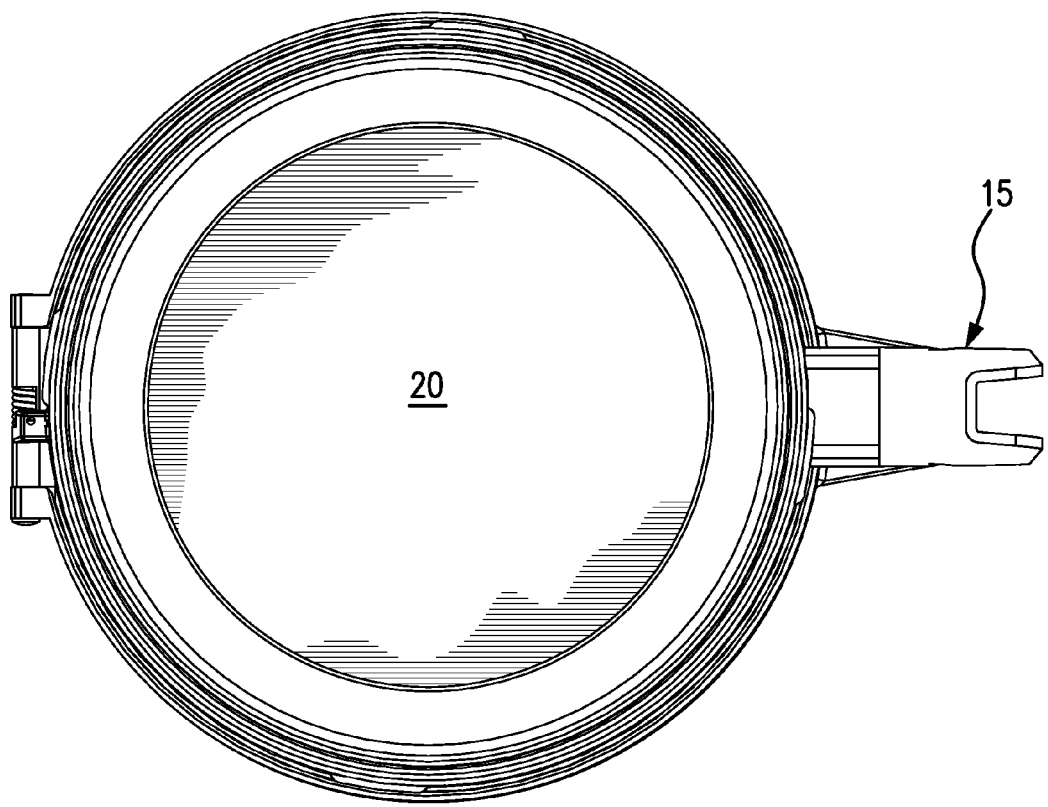
FIG. 9 is a bottom view of the device shown in FIG. 1.
Figure 10:
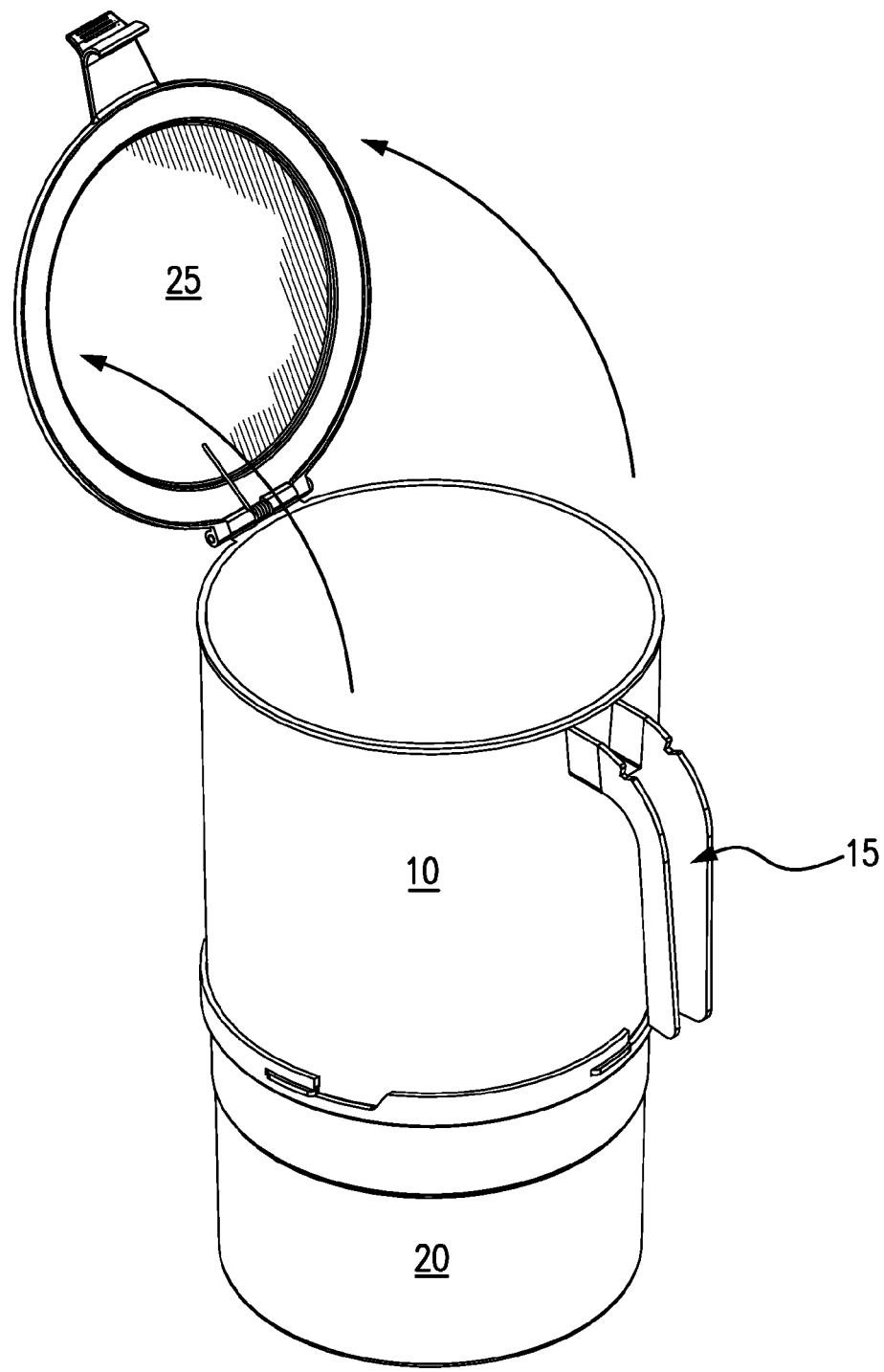
FIG. 10 is a perspective view of the device shown in FIG. 1 with the lid in an open position for placement of food inside the food chamber.
Figure 11:
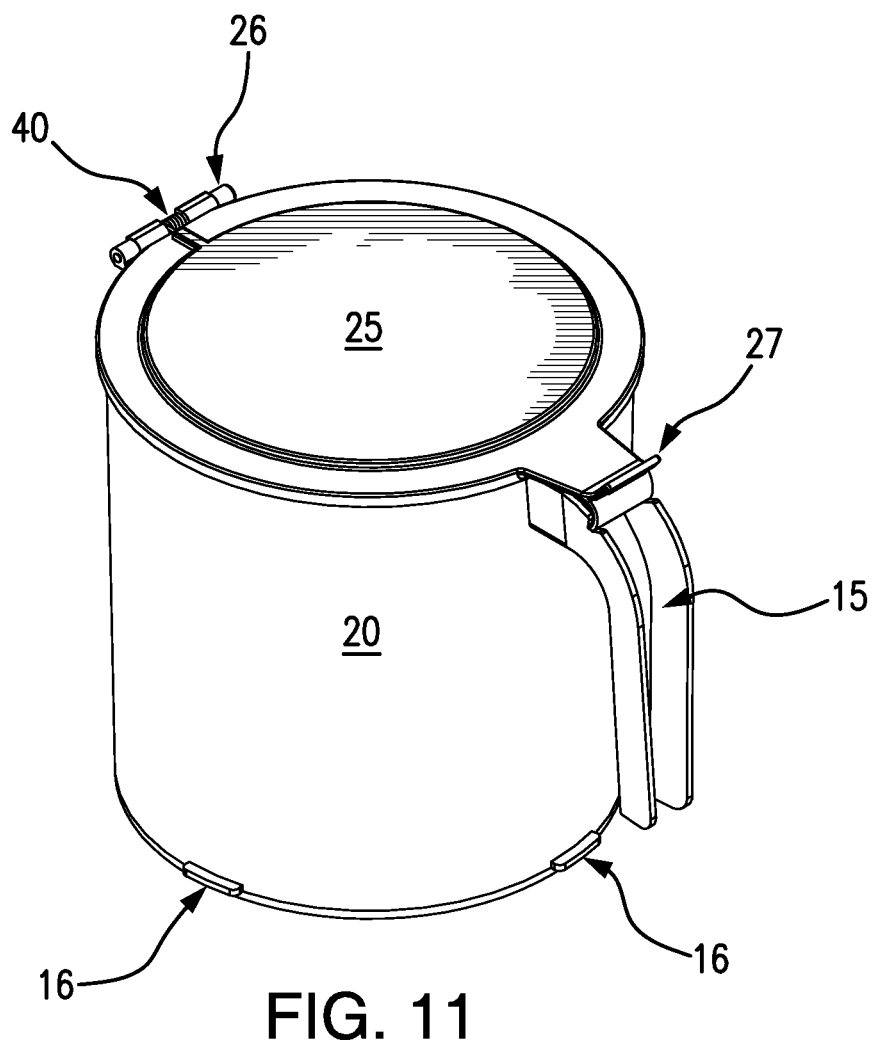
FIG. 11 is a perspective view of the food chamber portion of the device disconnected from the flour chamber which is not shown in the figure.
Figure 12:
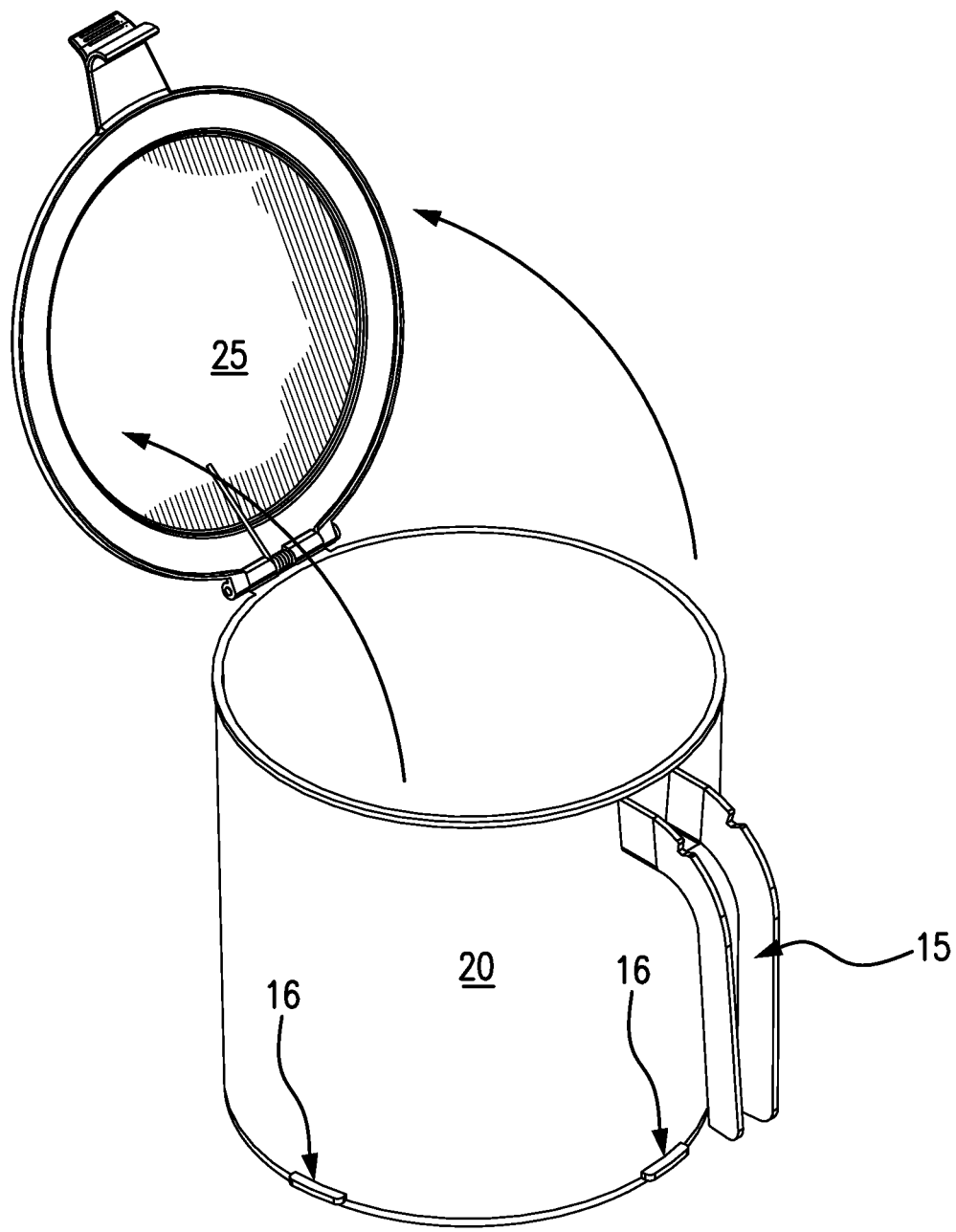
FIG. 12 is a perspective view of the food chamber portion of the device shown in FIG. 11 disconnected from the flour chamber with the lid in an open position.

Reference is being made in detail to presently preferred embodiments of the invention. Selective embodiments are provided by way of explanation of the invention, which is not intended to be limited thereto. In fact, those of ordinary skill in the art may appreciate upon reading the present specification and viewing the present drawings that various modifications and variations can be made.

The present invention is a handheld device for flouring/breading comprising two chambers that are capable of removably connecting together each chamber having a sieve. The top chamber (the food chamber) can connect to the bottom chamber (the flour chamber) in a screw-like fashion, using grooves and channels, using buttons and snap fittings, using magnets, hook and loop tape, wing nuts, or the like. Preferably, the openings in the sieve in the food chamber are greater in size than the openings in the sieve in the flour chamber. Preferably, the sieve in the flour chamber is removable. The device further comprises a gasketed, flip top, lid hingedly connected to the food chamber and a handle for grasping the device with one hand. The flip top lid is preferably hinged with a spring that when opened is kept open preventing the lid from closing when the device is tilted. The present invention also includes the above device with more than two sieves decreasing in opening size from the top down in the device.

The handheld device according to the present invention comprises a food chamber 10 and a flour chamber 20. The food chamber 10 includes a handle 15 on the outside of the chamber. The bottom of the food chamber 10 is open such that foods (e.g., flour) can pass through the bottom. The inside of the food chamber 10 includes a food chamber sieve 90, preferably located near the bottom end the chamber. The food chamber sieve 90 includes openings (round, square, triangular, etc.). Most preferably, the food chamber sieve 90 is removable from said food chamber 10 but it is understood and within the scope of the invention for the food chamber sieve to be permanently attached in said food chamber 10. Food chamber 10 further comprises a spring hinged lid 25. As shown in FIGS. 1-12, lid 25 includes pin eyes 26 which line up with eyes 11 on the top of the food chamber configured to receive a hinge pin 30 with a spring 40 thereon. The spring hinged lid 25 is kept closed with the spring 40 in tension by securing a fastening mechanism on the opposite side of the hinge, preferably at the top of handle 15. As shown in the figures, the push tab 27 on the lid 25 fits into grooves 19 in the top of the handle 15 to hold the lid 25 in a closed position. When the user wants to open the lid 25, push tab 27 is lifted (preferably using the thumb on the hand grasping the handle 15) causing spring 40 to push the lid 25 open and keep the lid 25 open until pressed/forced down and closed.

In the embodiment shown in FIGS. 1-12, the bottom end/edge of food chamber 10 includes four tabs 16. Tabs 16 are configured to fit into openings and grooves/slots 17 in the top of said flour chamber 20 to connect the two chambers together. Alternative fastening mechanisms for the two chambers, such as male and female threads, snap fittings, and the like are included in the scope of the invention.

The flour chamber 20 comprises an open top and a removable flour chamber sieve 80 inside. Preferably, the flour chamber sieve 80 includes a lip 85 around its perimeter that rests upon a ledge 22 on the top of the flour chamber 20. Flour chamber sieve 80 preferably includes a knob (as shown in FIG. 14A) to enable easy removal of the flour chamber sieve 80 after use of the device to discard unwanted food.

Figure 13A:
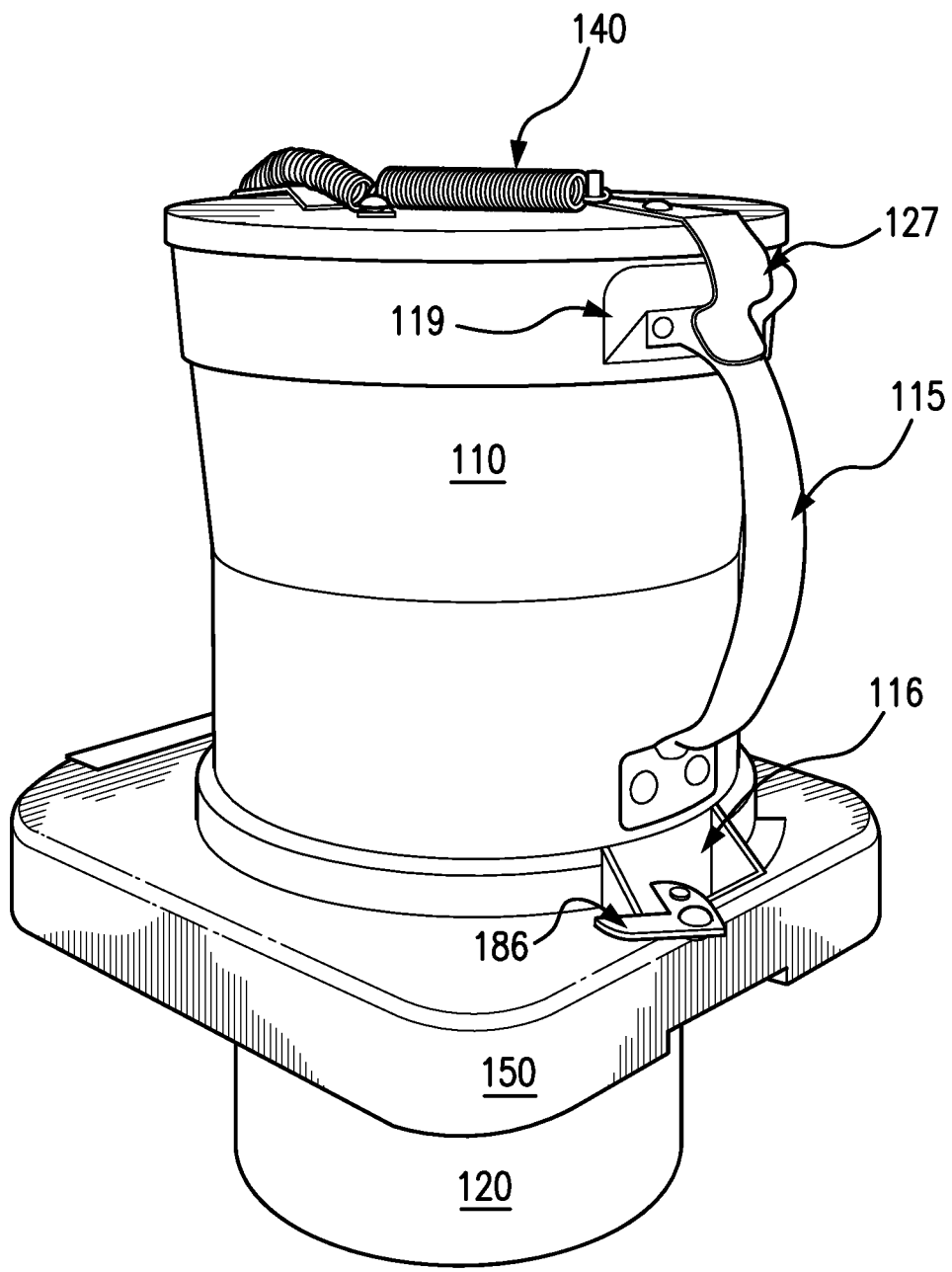
FIGS. 13A-F show another embodiment of the invention comprising a rectangular block attached to the top of the flour chamber wherein the food chamber connects to the rectangular block using a tab and slot on one side and a latch on the other to hold the food chamber on the rectangular block.
Figure 13B:
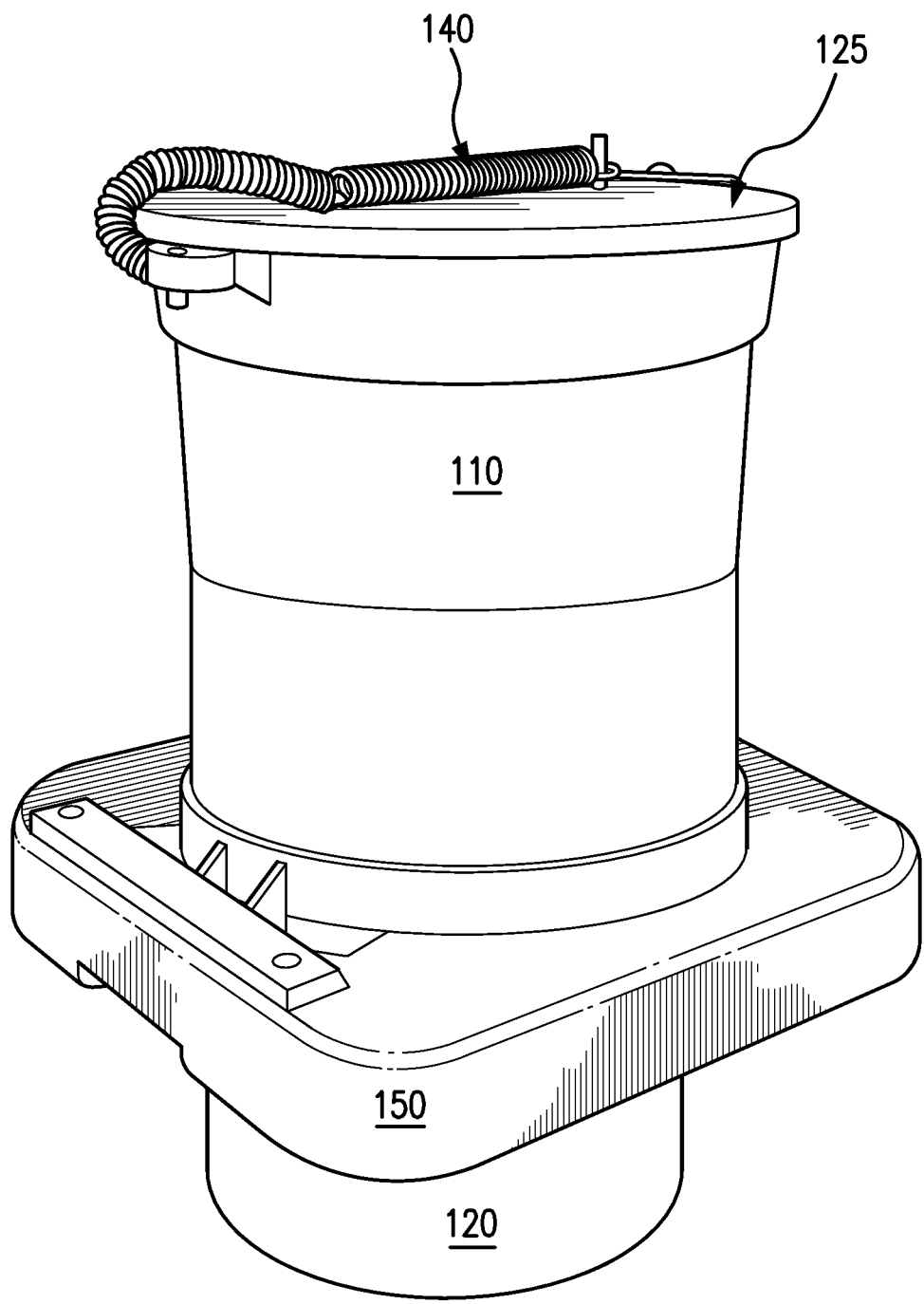
Figure 13C:
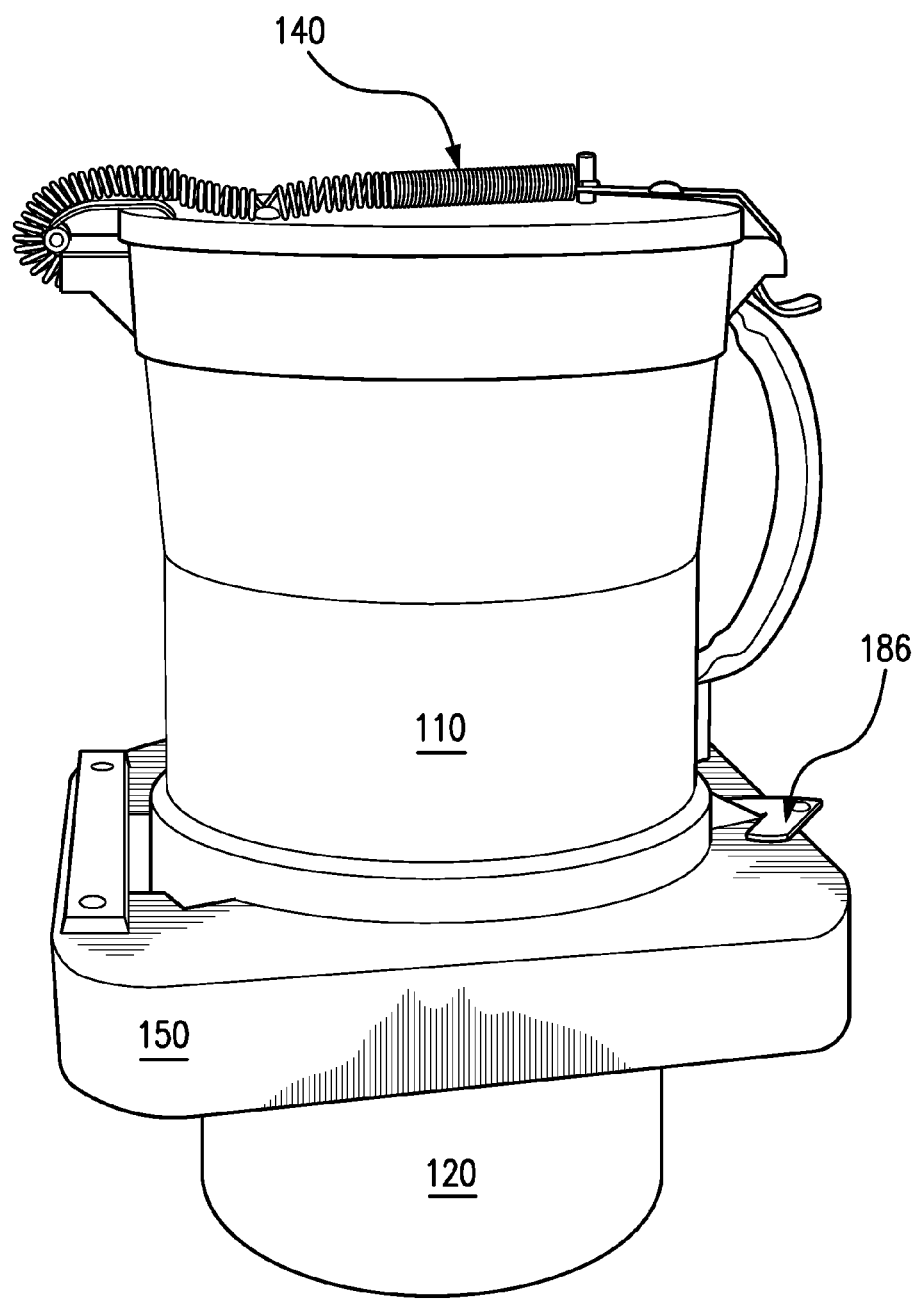
Figure 13D:
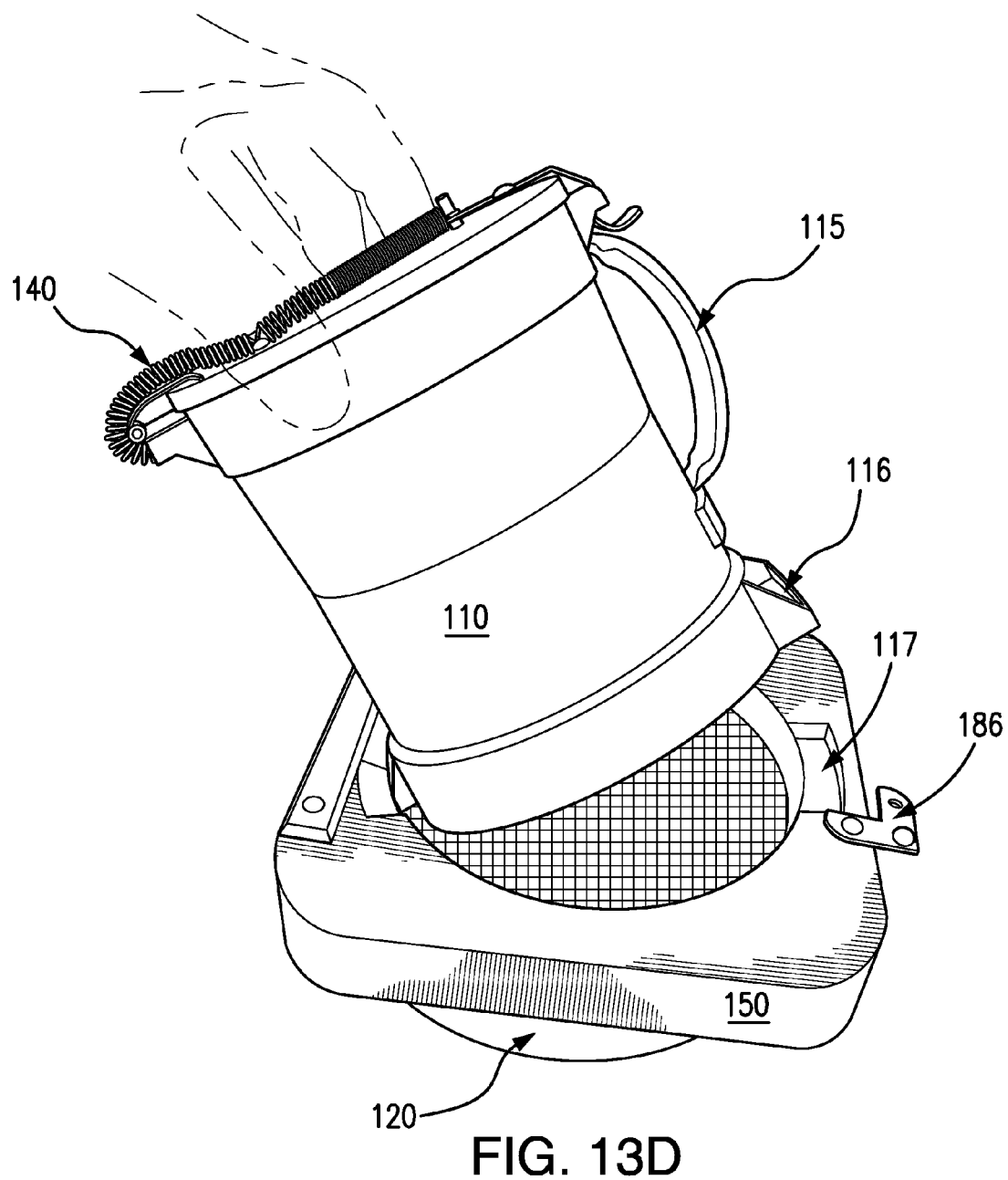
Figure 13E:
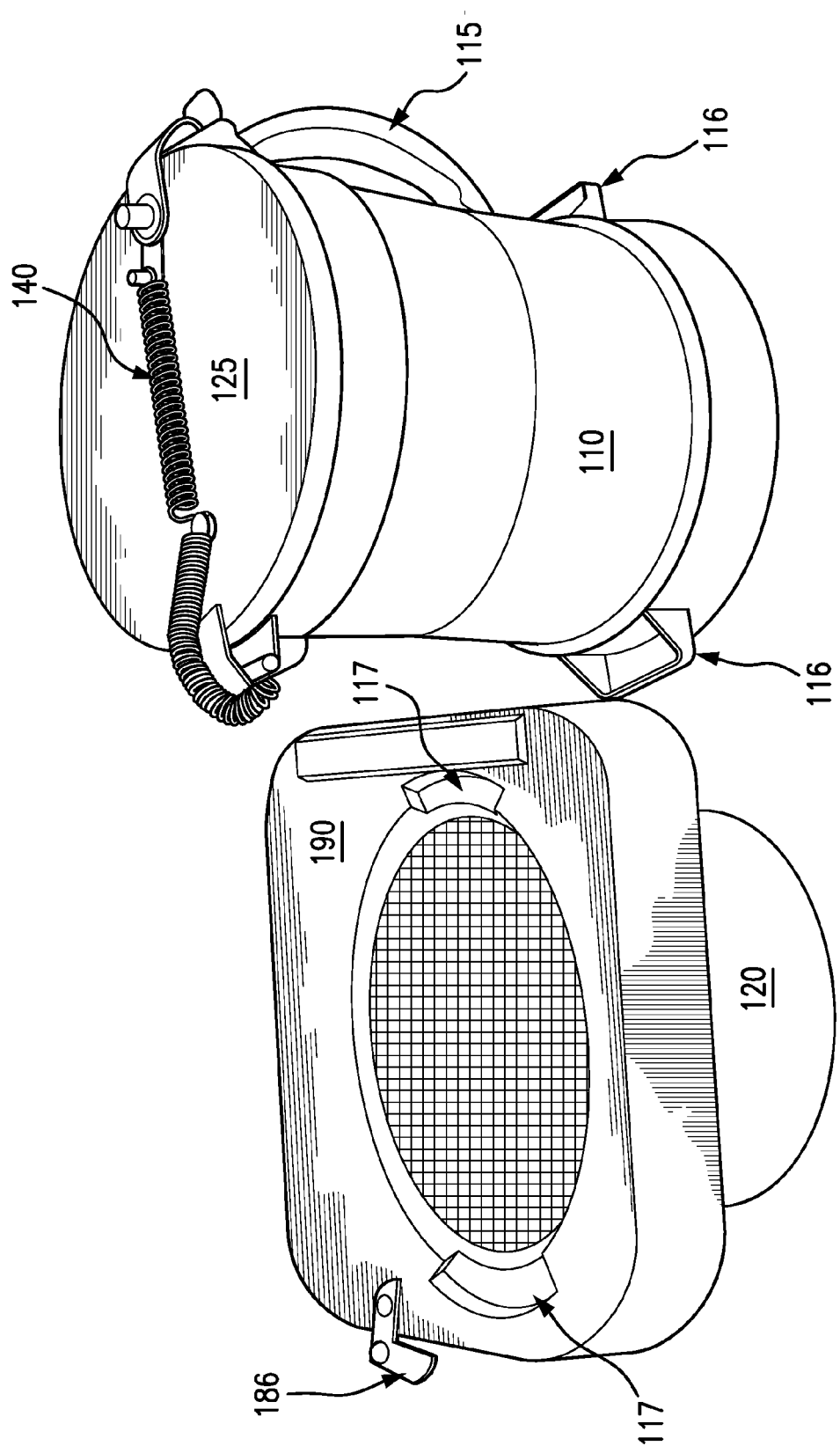
Figure 13F:
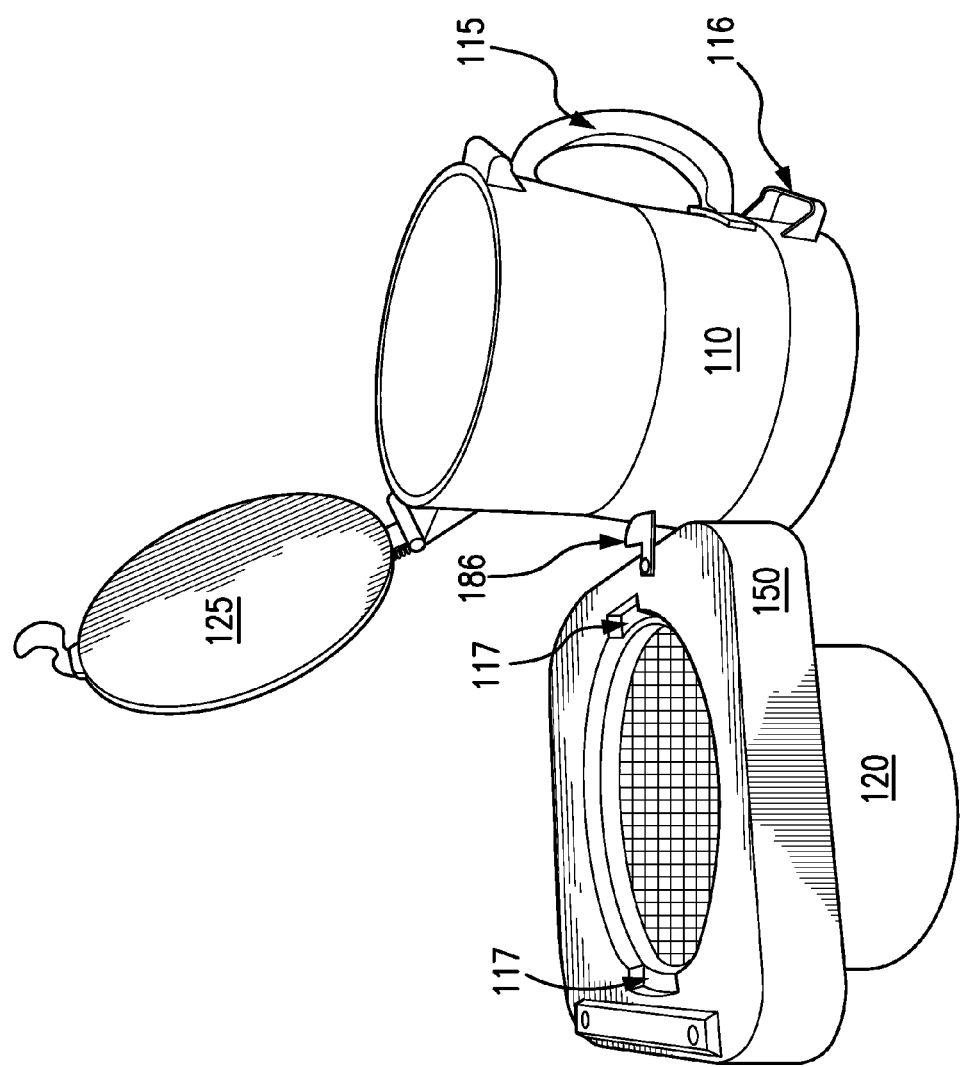

FIGS. 13A-F show another embodiment of the invention comprising a rectangular block 110 attached to the top of the flour chamber 120 wherein the food chamber 110 connects to the rectangular block 150 using a tab 116 and slot 117 on one side and a latch 186 on the other to hold the food chamber 110 on the rectangular block 150. FIGS. 13E and 13F show the food chamber 110 detached from the flour chamber 120. FIG. 13F shows an open lid 125 on the food chamber 110. The handle 115 is on the outside of the chamber. The bottom of the food chamber 110 is open such that foods (e.g., flour) can pass through the bottom. The inside of the food chamber 110 includes a food chamber sieve 190 (not shown) preferably located near the bottom end the chamber. Food chamber 110 further comprises a spring hinged lid 125. As shown in FIGS. 13A-F, lid 125 includes a spring 140 thereon. The spring hinged lid 125 is kept closed with the spring 140 in tension by securing a fastening mechanism on the opposite side of the hinge, preferably at the top of handle 115. As shown in the figures, the push tab 127 on the lid 125 fits into a groove 119 in the top of the handle 115 to hold the lid 125 in a closed position. When the user wants to open the lid 125, push tab 127 is lifted (preferably using the thumb on the hand grasping the handle 115) causing spring 140 to pull the lid 125 open and keep the lid 125 open until pressed/forced down and closed. The flour chamber 120 comprises an open top and a removable flour chamber sieve 180 inside.

Figure 14A:
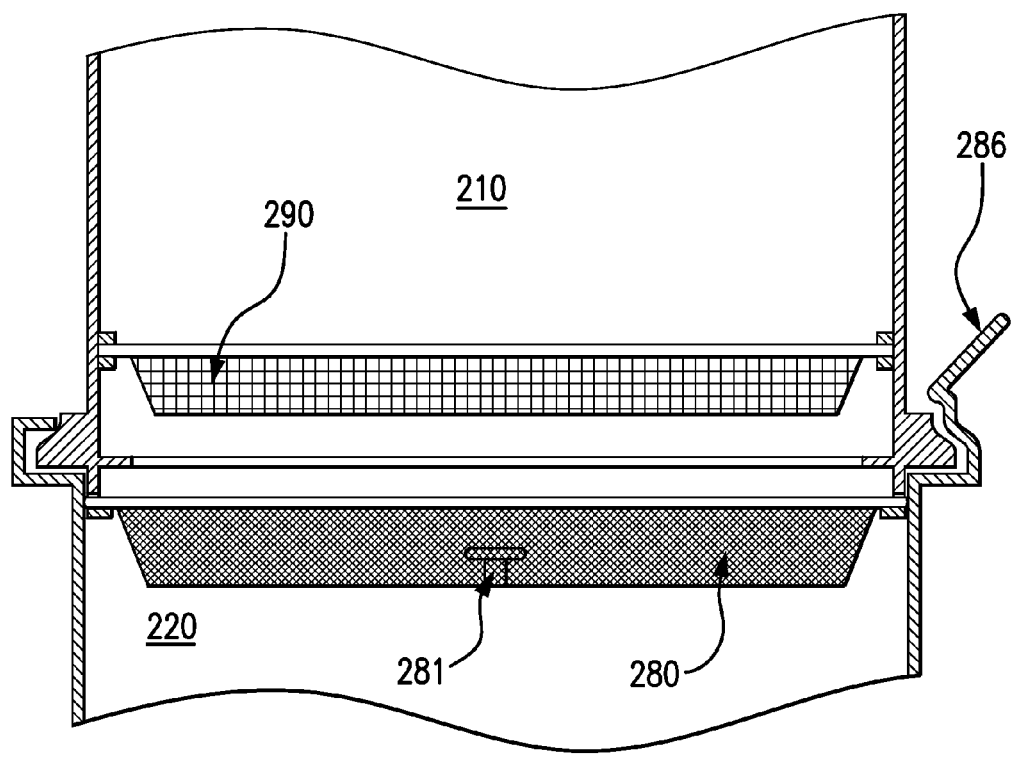
FIGS. 14A-D show alternative embodiments of the invention.
Figure 14B:
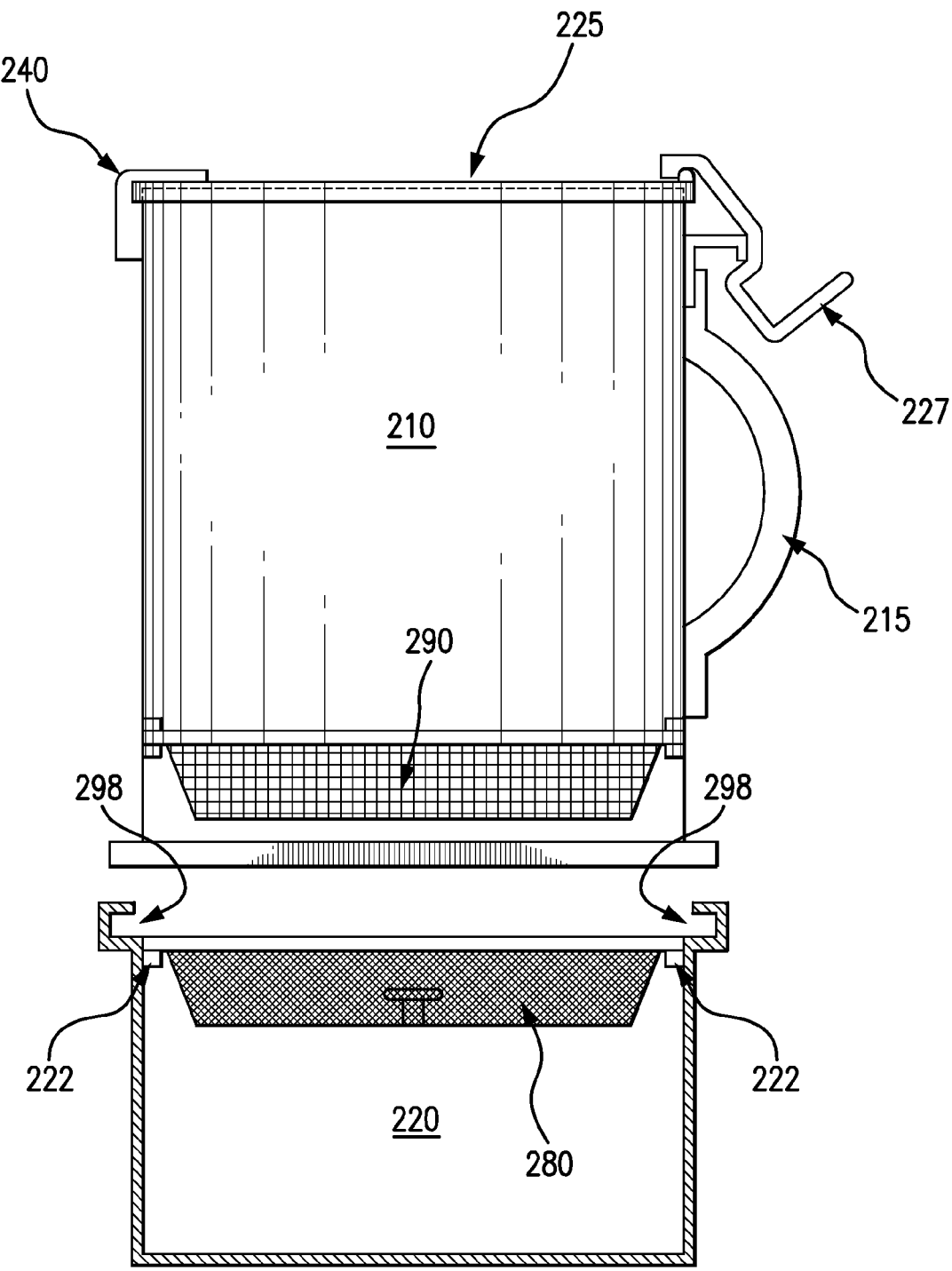
Figure 14C:
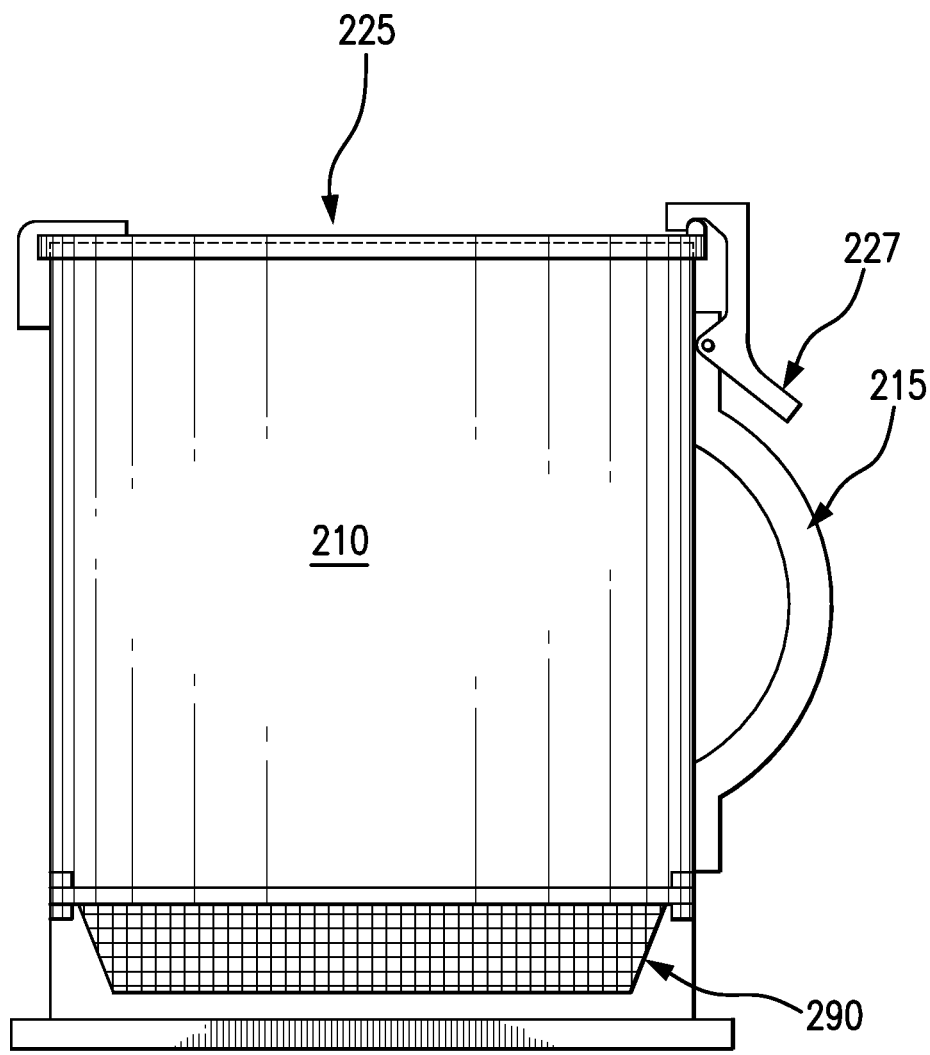
Figure 14D:
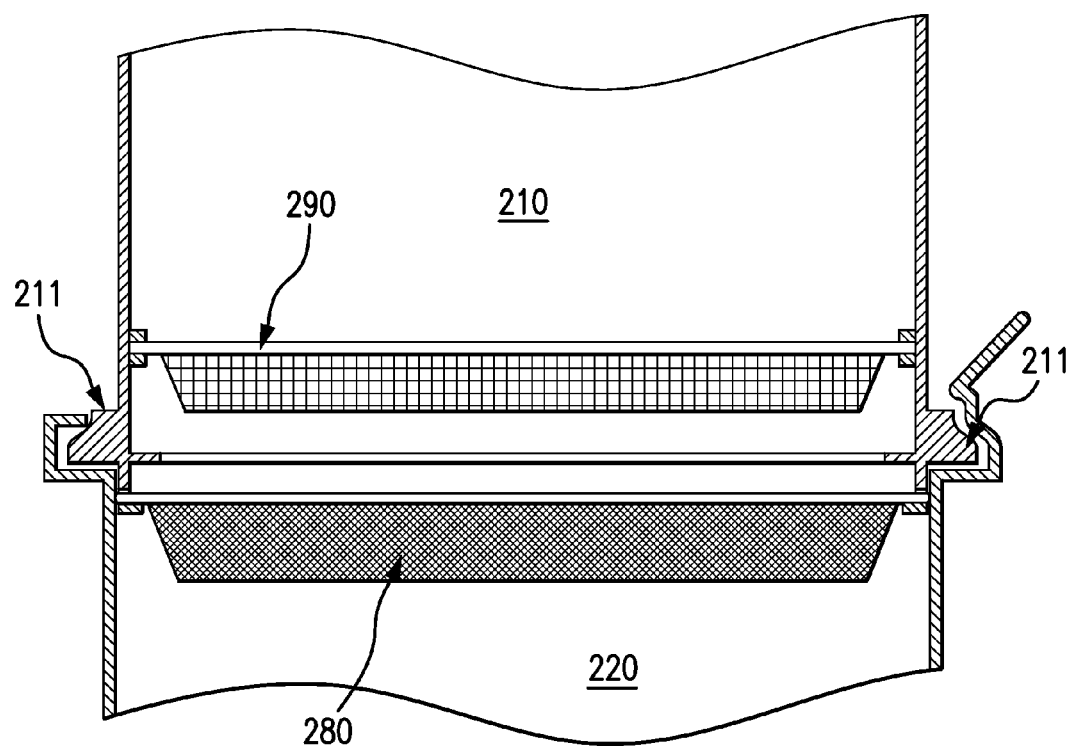

FIGS. 14A-D show alternative embodiments of the invention. FIG. 14A shows a partial cross sectional front view of an embodiment having a flour chamber sieve 280 having ¹⁄₁₆-inch square openings with a knob 281 to grasp for removal of the flour chamber sieve 280 (shown with ¼-inch square openings) and a push down release mechanism 286 to hold the food chamber 210 connected to the flour chamber 220. FIG. 14B shows a channel 298 at the top of the flour chamber 220 with a push up lid release 227. FIG. 14C shows a push down lid release 227. FIG. 14D shows a ¼-inch lip 211 around the bottom of the food chamber 210 that functions to help maintain the position of the flour chamber sieve 280.

Figure 15A:
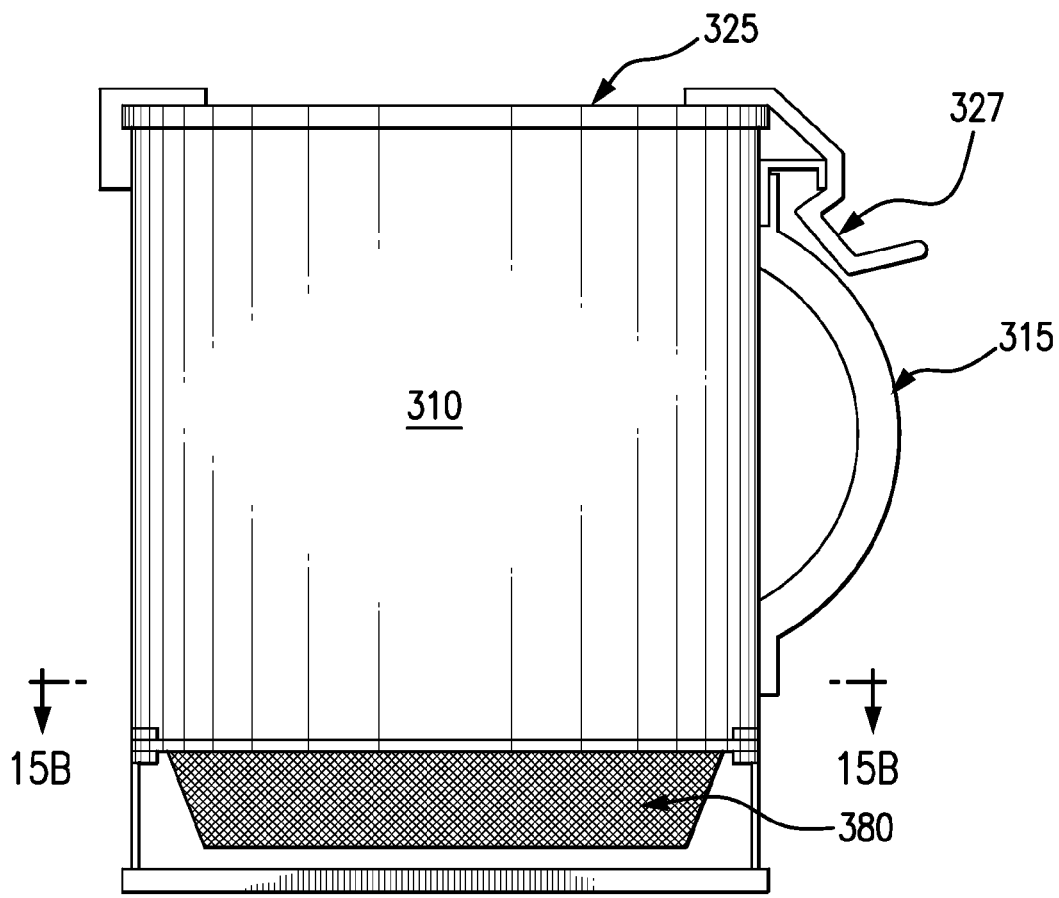
FIGS. 15A and 15B show a side view and a sectional view of an alternative embodiment for a food chamber with an about square shaped bottom.
Figure 15B:
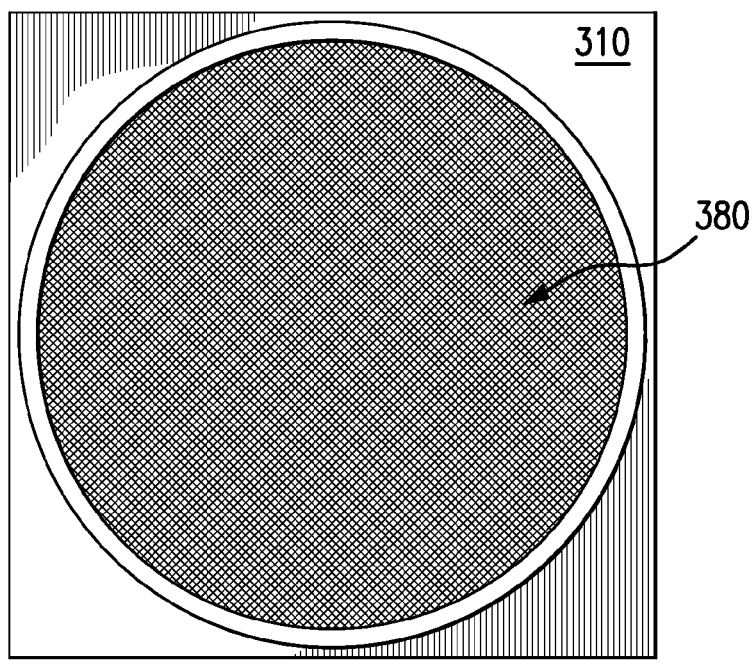
Figure 16A:
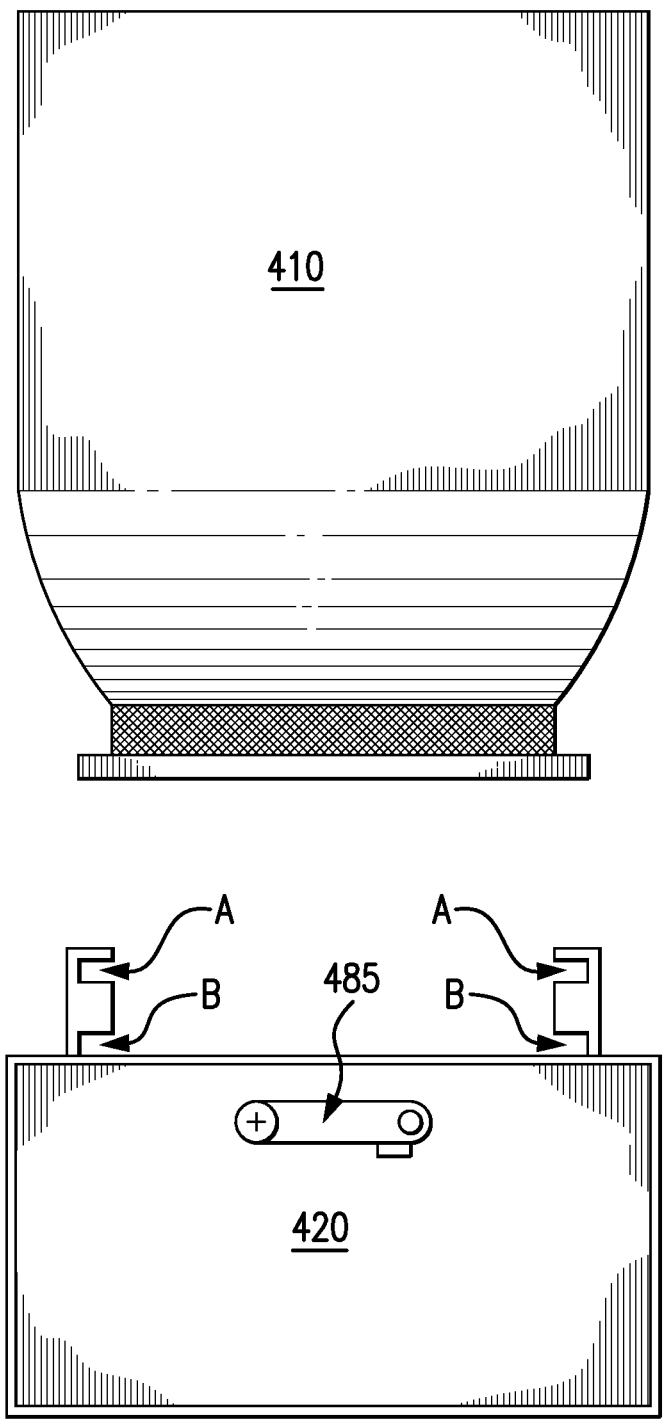
FIGS. 16A-C show alternative embodiments for the flour chamber including a non-cylindrical shape. The embodiments shown in FIGS. 16A-C also show a channel system with a lever to lock the food chamber and the flour chamber sieve in place.
Figure 16B:
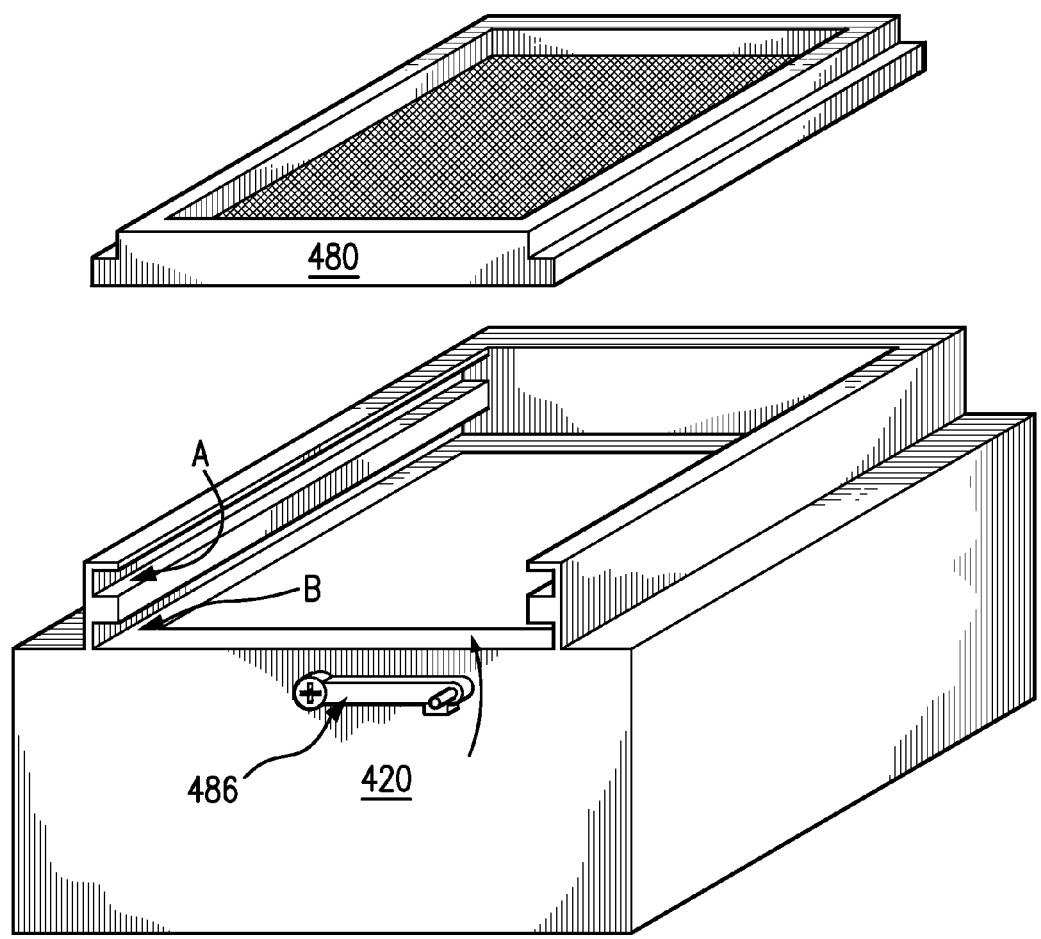
Figure 16C:
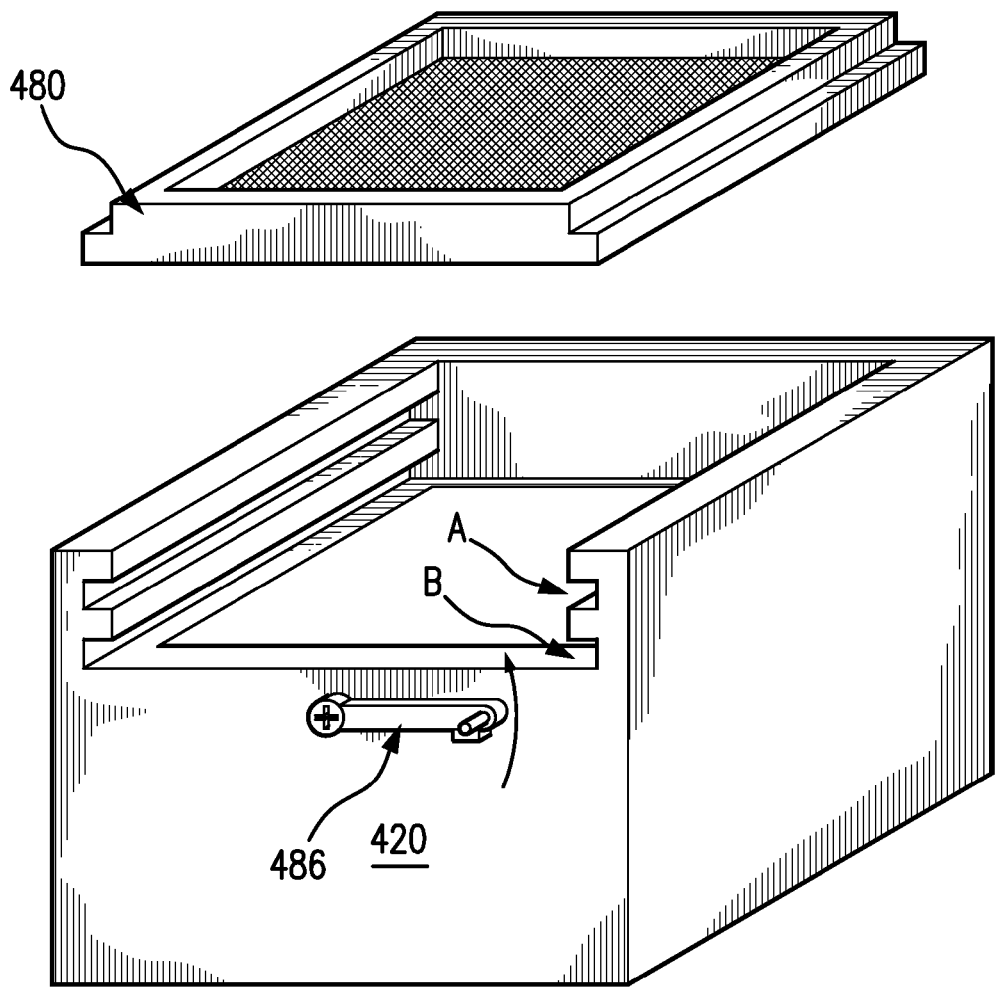

FIGS. 15A and 15B show a side view and a sectional view of an alternative embodiment for a food chamber 310 with an about square shaped bottom and FIGS. 16A-C show alternative embodiments for the flour chamber 420 including a non-cylindrical shape. The embodiments shown in FIGS. 16A-C also show a channel system with a lever 486 to lock the food chamber 410 and the flour chamber sieve 480 in place. Channel A is configured for the bottom of the food chamber 410 which slides into the channel A. Channel B is configured for the flour chamber sieve 480 which slides into the channel B.

METHOD OF USING THE INVENTION

The method and the use of the invention will be described. First the flour chamber 20 is filled with a flour mixture (e.g., flour, corn meal, bread crumbs etc.). This can be done with the flour chamber 20 separated from the food chamber 10 or with the two chambers connected. With the lid 25 open, the food to be floured/breaded is placed into the food chamber 10 on top of the food chamber sieve 90 therein. The user closes the lid 25 and engages the fastener (e.g., clasp, snap, tab and groove) to keep the lid 25 closed. In FIGS. 1-12, the user would close the lid 25 causing the push tab 27 to enter into the grooves 19 in the handle 15. For those embodiments with a gasket at the top of the food chamber, the lid 25 compresses the gasket and seals the top of the food chamber 10. With the lid 25 closed, the user can now shake (tilt back and forth, upside down, etc.) the entire device causing the flour mixture originally in the flour chamber 20 to travel through the sieves 80 and 90 into the food chamber 10 and onto the food causing the food to become coated with the flour mixture.

When done shaking, the device is returned to its upright position causing the floured food to come to rest on the food chamber sieve 90 and the unattached flour mixture to fall through the food chamber sieve 90. Pieces of food and clumps of flour mixture smaller in size than the openings in the food chamber sieve 90 fall through the food chamber sieve 90. Pieces of food and clumps of flour mixture smaller in size than the openings in the flour chamber sieve 80 fall through the flour chamber sieve 80. Pieces of food and clumps of flour mixture larger in size than the openings in the flour chamber sieve 80 are retained on the flour chamber sieve 80.

The user disconnects the food chamber 10 from the flour chamber 20, preferably with a small turn of one with respect to the other thereby unlocking the two chambers 10 and 20. The food chamber 10 is lifted off the flour chamber 20 and the food chamber 10 containing the floured food is brought to the appliance that will cook the food (or the location where the food is to be dredged). Preferably with one hand, the flip-top lid 25 is released by pushing up on the push tab 27 and the lid 25 is held open by the spring 40 on the hinge. The floured food is then poured/dropped into the cooking appliance (e.g., fryer). Before re-connecting the food chamber 10 to the flour chamber 20, if desired, the user can remove the flour chamber sieve 80 and any contents thereon from the flour chamber 20 and discard the unwanted contents. The flour chamber sieve 80 is then replaced and the food chamber 10 is re-connected to the flour chamber 20 for the next use.

The underside (exterior of the bottom) of the flour chamber 20 could be made to not slip on the surface it is placed by putting a piece of rubber on the bottom or using hook and loop tape or it could have magnets placed on the bottom so that it could magnetically fasten to many metal and stainless type tables. The bottom of the flour chamber 20 could be made in a hexagonal shape or another non-circular shape, or with a locking notch or key, so that it may fit into a corresponding opening or hole or opening so that the user can more easily separate the food chamber 10 from the flour chamber 20 with only one hand. The flour chamber 20 could also be made heavier than the food chamber so as to make the connecting and separating of the two chambers easier for the user.

We claim:

1. A handheld device for flouring foods comprising a food chamber and a flour chamber;
    said food chamber comprising a handle on the outside, an open bottom, a food chamber sieve inside the food chamber, and a spring hinged lid;
    said flour chamber comprising an open top and a removable flour chamber sieve inside the flour chamber;
    wherein said food chamber is removably connectable to said flour chamber;
    wherein when said lid is closed and said food chamber is connected to said flour chamber the contents in said device are sealed inside.

2. The device according to claim 1 wherein said removable flour chamber sieve comprises a grasping knob.

3. The device according to claim 1 wherein said openings in said flour chamber sieve are smaller than the openings in said food chamber sieve.

4. The device according to claim 1, wherein said bottom of said food chamber includes tabs configured to fit into openings and slots in the top of said flour chamber.

5. A handheld device for flouring foods comprising a food chamber and a flour chamber;
    said food chamber comprising a handle on the outside, an open bottom, a food chamber sieve inside the food chamber, and a spring hinged lid;
    said flour chamber comprising an open top and a removable flour chamber sieve inside the flour chamber;
    wherein said food chamber is removably connectable to said flour chamber;
    wherein when said lid is closed and said food chamber is connected to said flour chamber the contents in said device are sealed inside; and
    wherein said handle comprises at least one groove configured to receive a push tab on said lid that holds said lid down on the top of said food chamber, wherein said lid is released open when said push tab on said lid is pushed out of said groove in said handle.

6. A handheld device for flouring foods comprising a food chamber and a flour chamber;
    said food chamber comprising a handle on the outside, an open bottom, at least one food chamber sieve inside the food chamber to retain a first food thereon, a spring hinged lid, and at least two tabs at said bottom;
    said flour chamber comprising an open top, a removable flour chamber sieve inside the flour chamber, and at least two channels at a top of said flour chamber configured to receive said tabs in said food chamber;
    said food chamber removably connectable to said flour chamber using said tabs and grooves, said device further comprising a compressible gasket between said food chamber and said flour chamber;
    wherein when said first food is placed in said food chamber and a flour is placed in said flour chamber with said food chamber connected to said flour chamber using said tabs and grooves, said device can be inverted mixing the flour with said first food in said food chamber causing said flour to attach to said first food without the contents falling out of said device.

7. The device according to claim 6, wherein an underside of said flour chamber comprises rubber pads.

8. The device according to claim 6, wherein an underside of said flour chamber comprises magnets.

9. The device according to claim 6, wherein said handle comprises at least one groove configured to receive a push tab on said lid that holds said lid down on the top of said food chamber, wherein said lid is released open when said push tab on said lid is pushed out of said groove in said handle.

10. The device according to claim 6 wherein said removable flour chamber sieve comprises a grasping knob.

11. A handheld device for flouring foods comprising a food chamber and a flour chamber;
- said food chamber comprising a handle on an outside, an open bottom, a food chamber sieve inside said food chamber configured to retain a first food thereon, a spring hinged lid, and at least two tabs at said bottom;
- said flour chamber comprising an open top, a removable flour chamber sieve inside the flour chamber comprising a grasping knob and a compressible ring around a perimeter of said flour chamber sieve, and at least two channels at a top of said flour chamber configured to receive said tabs in said food chamber for removably connecting said food chamber to said flour chamber;
- said food chamber removably connectable to said flour chamber using said tabs and grooves;
- wherein when food is placed in said food chamber and flour is placed in said flour chamber with said food chamber connected to said flour chamber using said tabs and grooves, said compressible gasket is compressed sealing said food chamber to said flour chamber and said device can be inverted mixing the flour with the first food in said food chamber causing said flour to attach to said first food without the contents falling out of said device;
- wherein when said device is returned to an upright position, said floured first food is retained within said food chamber.

12. The device according to claim 11, wherein an underside of said flour chamber comprises rubber pads.

13. The device according to claim 11, wherein an underside of said flour chamber comprises magnets.

14. The device according to claim 11, wherein said handle comprises at least one groove configured to receive a push tab on said lid that holds said lid down on the top of said food chamber, wherein said lid is released open when said push tab on said lid is pushed out of said groove in said handle.

15. The device according to claim 11, wherein openings in said flour chamber sieve are smaller than openings in said food chamber sieve.

* * * * *